(12) United States Patent
Dote et al.

(10) Patent No.: US 11,334,646 B2
(45) Date of Patent: May 17, 2022

(54) INFORMATION PROCESSING APPARATUS AND METHOD FOR CONTROLLING SAMPLING APPARATUS

(71) Applicant: FUJITSU LIMITED, Kawasaki (JP)

(72) Inventors: Aki Dote, Isehara (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 16/795,652

(22) Filed: Feb. 20, 2020

(65) Prior Publication Data

US 2020/0272682 A1  Aug. 27, 2020

(30) Foreign Application Priority Data

Feb. 25, 2019  (JP) .............................. JP2019-031685

(51) Int. Cl.
*G06F 17/11*  (2006.01)

(52) U.S. Cl.
CPC .................................... *G06F 17/11* (2013.01)

(58) Field of Classification Search
CPC ................................ G06F 17/11; G06Q 10/04
See application file for complete search history.

(56) References Cited

U.S. PATENT DOCUMENTS

2018/0107172 A1* 4/2018 Takatsu .................. G06N 7/005

FOREIGN PATENT DOCUMENTS

JP  2018-63626 A  4/2018

OTHER PUBLICATIONS

Matsubara, Satoshi. "Ising-Model Optimizer with Parallel-Trial Bit-Sieve Engine." Link.springer.com, 2017, link.springer.com/chapter/10.1007/978-3-319-61566-039. (Year: 2017).*
K. Dabiri, M. Malekmohammadi, A. Sheikholeslami and H. Tamura, "Replica Exchange MOMO Hardware With Automatic Temperature Selection and Parallel Trial," in IEEE Transactions on Parallel and Distributed Systems, vol. 31, No. 7, pp. 1681-1692, Jul. 1, 2020, doi: 10.1109/TPDS.2020.2972359. (Year: 2020).*

(Continued)

*Primary Examiner* — Emily E Larocque
*Assistant Examiner* — Huy Duong
(74) *Attorney, Agent, or Firm* — Fujitsu Patent Center

(57) ABSTRACT

An information processing apparatus includes: a memory; and a processor coupled to the memory and configured to: hold values of a plurality of state variables included in an evaluation function representing energy, and outputs, every certain number of trials, the values of the plurality of state variables; compute, when a state transition occurs in response to changing of one of the values of the plurality of state variables, an energy change value for each state transition based on a weight value selected based on an update index value; and determine a first offset value based on a plurality of the energy change values such that at least one of the state transitions is allowed, outputs a plurality of first evaluation values obtained by adding the first offset value to the plurality of energy change values, and outputs, every certain number of trials, the first offset value.

3 Claims, 21 Drawing Sheets

(56) References Cited

OTHER PUBLICATIONS

Vatankhahghadim, Behraz, "A Fully-Connected Boltzmann Machine with Virtual FPGAs", pp. 1-68, Jul. 2018 Retrieved from the Internet: URL:https://tspace.library.utoronto.ca/bitstream/1807/95632/3/Vatankhahghadim_Behraz_201806_MAS_thesis.pdf [retrieved on Apr. 3, 2020].

Extended European Search Report dated Sep. 1, 2020 for corresponding European Patent Application No. 20157619.6, 10 pages. *Please note US-2018/0107172-A1 cited herewith, was previously cited in an IDS filed on Feb. 20, 2020.*

* cited by examiner

INFORMATION PROCESSING APPARATUS AND METHOD FOR CONTROLLING SAMPLING APPARATUS

CROSS-REFERENCE TO RELATED APPLICATION

This application is based upon and claims the benefit of priority of the prior Japanese Patent Application No. 2019-31685, filed on Feb. 25, 2019, the entire contents of which are incorporated herein by reference.

FIELD

The embodiments discussed herein are related to a sampling apparatus and a method for controlling a sampling apparatus.

BACKGROUND

As a technique for solving a combinatorial optimization problem, there is a technique for converting a combinatorial optimization problem into the Ising model representing behaviors of spins in a magnetic body and for shifting the state of the Ising model to a low-energy state using a Markov chain Monte Carlo method. Hereinafter, the Markov chain Monte Carlo method is abbreviated as MCMC method.

Related art is disclosed in Japanese Laid-open Patent Publication No. 2018-63626).

SUMMARY

According to an aspect of the embodiments, an information processing apparatus includes: a memory; and a processor coupled to the memory and configured to: hold values of a plurality of state variables included in an evaluation function representing energy, and outputs, every certain number of trials, the values of the plurality of state variables; compute, when a state transition occurs in response to changing of one of the values of the plurality of state variables, an energy change value for each state transition based on a weight value selected based on an update index value; determine a first offset value based on a plurality of the energy change values such that at least one of the state transitions is allowed, outputs a plurality of first evaluation values obtained by adding the first offset value to the plurality of energy change values, and outputs, every certain number of trials, the first offset value; output a plurality of first flag values each indicating whether or not to allow the corresponding state transition, based on results of comparing the plurality of first evaluation values with a threshold that is determined based on a random number value and a temperature value indicating a temperature; output, every certain number of trials, a first count value obtained by counting the number of first flag values indicating allowance of the state transition among the plurality of first flag values; and output, as the update index value, an index value corresponding to one of the state transitions, based on the plurality of first flag values or the plurality of energy change values.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
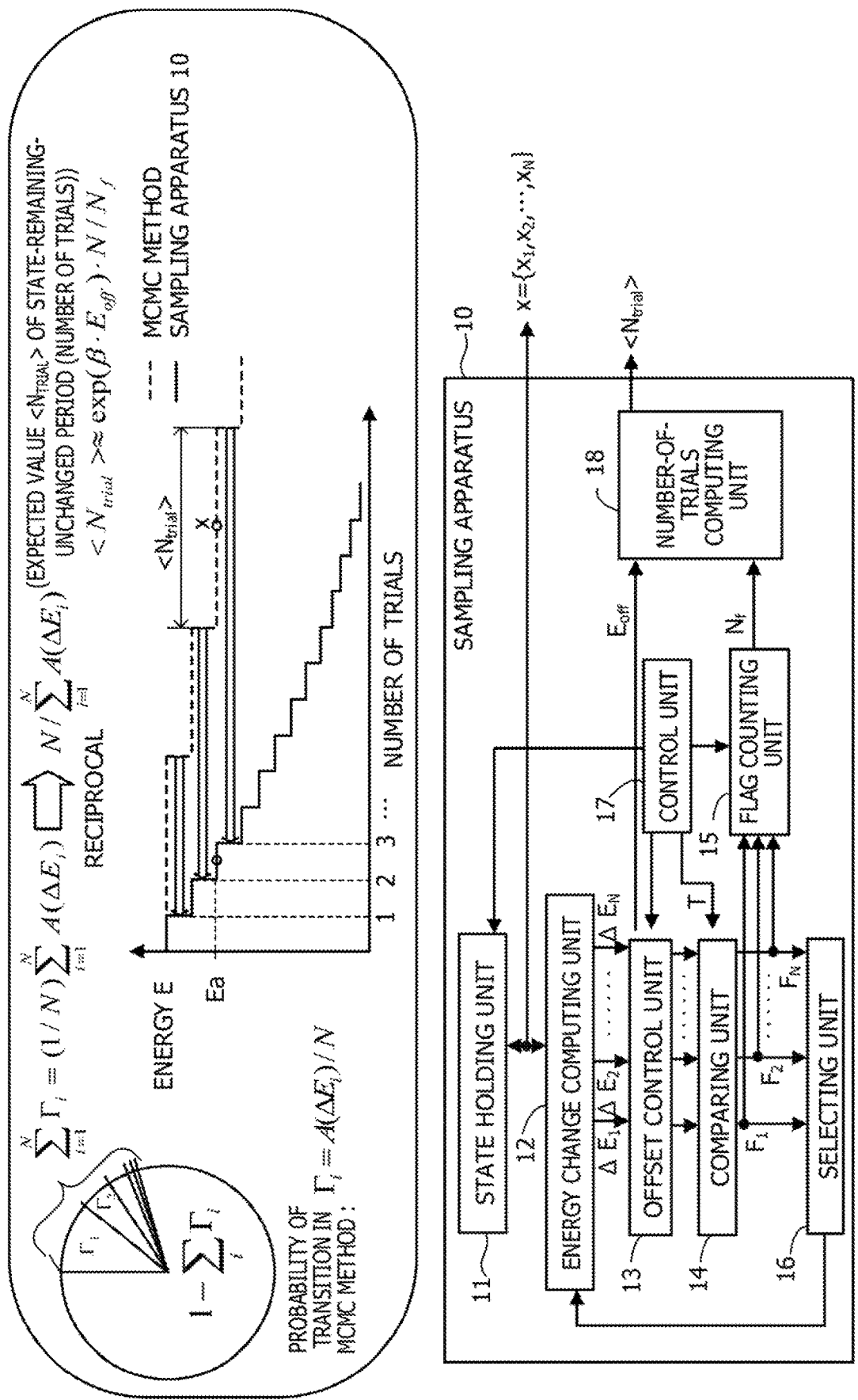
FIG. 1 is a diagram illustrating an example of a sampling apparatus according to a first embodiment.

The state of the Ising model is representable by a combination of values of a plurality of state variables. When the number of state variables is equal to N, the state of the Ising model is represented by $x=(x_1, x_2, \ldots, x_N)$ or the like. Each of the state variables may use a value of 0 or 1.

An Ising-type energy function $E(x)$ representing the energy of the Ising model is defined by, for example, equation (1) below.

$$E(x) = -\sum_{<i,j>} W_{ij} x_i x_j - \sum_i b_i x_i \quad (1)$$

The first term on the right side is obtained by adding up products of the values (each being 0 or 1) of two state variables and a weight value (representing the intensity of interaction between the two state variables) for all the combinations of all the state variables of the Ising model without any omission and duplication. In equation (1), $x_i$ denotes a state variable having identification information (hereinafter referred to as an index value) of i, $x_j$ denotes a state variable having an index value of j, and $W_{ij}$ denotes a weight value indicating the magnitude of interaction between the state variables having the index values of i and j.

The second term on the right side is a sum of products of a bias coefficient and the state variable that have each index value. In equation (1), $b_i$ denotes the bias coefficient for the index value of i.

When the state variable $x_i$ changes to 1-$x_i$, an increase in the state variable $x_i$ is represented by $\Delta x_i=(1-x_i)-x_i=1-2x_i$. An energy change $\Delta E_i$ in response to spin inversion (the change in the value of the state variable) is represented by equation (2) below.

$$\Delta E_i = E(x)|_{x_i \to 1-x_i} - E(x) = -\Delta x_i \left( \sum_j W_{ij} x_j + b_i \right) = -\Delta x_i h_i \quad (2)$$

In equation (2), when the state variable $x_i$ changes from 1 to 0, $\Delta x_i$ is equal to -1. When the state variable x changes from 0 to 1, $\Delta x_i$ is equal to 1. Note that $h_i$ is referred to as a local field. A value obtained by multiplying the local field $h_i$ by a sign factor (+1 or -1) in accordance with the value $\Delta x_i$ is the energy change $\Delta E_i$.

As an allowable probability of a certain state transition with respect to the energy change $\Delta E$ that occurs in response to the certain state transition, an allowable probability $A(\Delta E)$ defined by the Metropolis method or the Gibbs method represented by equation (3) below may be used.

$$A(\Delta E) = \begin{cases} \min[1, \exp(-\beta \cdot \Delta E)] & \text{Metropolis method} \\ 1/[1 + \exp(\beta \cdot \Delta E)] & \text{Gibbs method} \end{cases} \quad (3)$$

In equation (3), $\beta$ denotes an inverse temperature (reciprocal of a temperature value representing a temperature). The state transition involving an increase in energy is also allowable in terms of the probability.

In the ordinary MCMC method, a state variable is selected at random or in order of the index value (sequentially). Based on the energy change $\Delta E$ in response to the state transition in which the value of the state variable changes, the state transition is allowed with the aforementioned allowable probability $A(\Delta E)$. When the state transition is allowed, the value of the state variable is updated. Such processing is repeated a certain number of trials. A simulated annealing method in which the temperature is gradually lowered may be used in some cases to search for the lowest energy state (optimal solution).

On the other hand hardware for solving a combinatorial optimization problem at high speed, there is an optimization apparatus using digital circuitry. The optimization apparatus performs a parallel search for concurrently setting a plurality of state transitions as transition candidates to select one state transition as described below.

Based on the energy change that occurs in response to each of the state transitions and the temperature value, the optimization apparatus allows the state transition with the aforementioned allowable probability $A(\Delta E)$. The optimization apparatus preferentially selects one allowed state transition from among the plurality of state transitions and updates the state. The optimization apparatus repeatedly performs the above-described processing a certain number of trials. When the state transition does not occur because the state is trapped in a local solution or the like, the optimization apparatus of the related art adds an offset value to the energy change.

In the equilibrium state, a probability distribution indicating occupancy probabilities of the individual states is the Boltzmann distribution. Therefore, a sampler for generating a sample according to the Boltzmann distribution may be implemented by outputting, as the sample, a state obtained through a process of repeating a state transition with a fixed temperature using the MCMC method or values based on the state. The generated sample is used in calculation of an expected value in, for example, machine learning or the like.

However, since the optimization apparatus of the related art using digital circuitry speeds up computation processing by the aforementioned parallel search processing and addition of the offset value, the probability distribution potentially deviates from the Boltzmann distribution. When the optimization apparatus of the related art using digital circuitry is used as a sampler (hereinafter referred to as a sampling apparatus), the deviation of the probability distribution from the Boltzmann distribution may result in a lower sampling accuracy than that achieved in the case where the ordinary MCMC method is used.

In one aspect, a sampling apparatus capable of implementing highly accurate sampling without impairing the high-speed computation processing and a method for controlling the sampling apparatus may be provided.

Embodiments of the present disclosure will be described below with reference to the accompanying drawings.

In simulated annealing using the Ising model, only one state variable changes in response to a state transition. Accordingly, a description will be given below on the assumption that the index value for identifying each state transition is equal to the index value of the one state variable. However, the present disclosure is not limited to a configuration in which the index value of the state transition matches the index value of the state variable that changes in response to the state transition.

A reason why a probability distribution determined by an optimization apparatus of the related art deviates from the Boltzmann distribution is that the number of trials in which one state remains unchanged is less than that in the case where the ordinary MCMC method is used since the optimization apparatus speeds up computation processing by parallel search processing and addition of the offset value. When the optimization apparatus of the related art uses an ideal offset value, the number of trials in which one state remains unchanged is equal to 1.

Every time sampling is performed using the aforementioned offset value, the resultant sample may be weighted by a value of the number of trials in which the state would remain unchanged if the ordinary MCMC method were used or by an expected value of the value in order to obtain a sample according to the Boltzmann distribution. For example, when a certain state is observed (sampled) once, a weight may be applied to make the state be sampled the number of times equal to the number of trials that would be performed if the ordinary MCMC method were used.

In the ordinary MCMC method, a probability of transition from a certain state to another state in which the value of the state variable having the index value of i changes is equal to $\Gamma_i = A(\Delta E_i)/N$. $A(\Delta E_i)$ denotes an allowable probability of the state transition in which the value of the state variable having the index value of i changes. N denotes the total number of state variables. The probability of transition of a state to another state in each trial may be represented by equation (4) below.

$$\sum_{i=1}^{N} \Gamma_i = (1/N) \sum_{i=1}^{N} A(\Delta E_i) \quad (4)$$

A reciprocal of the probability represented by equation (4) is an expected value of the number of trials in which one state remains unchanged in the ordinary MCMC method.

A probability $P_i$ of the value of the state variable $x_i$ finally changing after several trials is represented by equation (5) below.

$$P_i = \Gamma_i \Big/ \sum_{j=1}^{N} \Gamma_j = A(\Delta E_i) \Big/ \sum_{j=1}^{N} A(\Delta E_j) \quad (5)$$

A sampling apparatus according to a first embodiment described below is an apparatus that outputs, every certain number of trails, an expected value of the number of trials in which one state remains unchanged in the ordinary MCMC method, together with the state.

First Embodiment

FIG. 1 is a diagram illustrating an example of the sampling apparatus according to the first embodiment.

A sampling apparatus 10 includes a state holding unit 11, an energy change computing unit 12, an offset control unit 13, a comparing unit 14, a flag counting unit 15, a selecting unit 16, a control unit 17, and a number-of-trials computing unit 18.

The state holding unit 11 holds values of a plurality of state variables included in an evaluation function representing energy, for example, and outputs the values of the plurality of state variables every certain number of trials. The evaluation function is, for example, the energy function $E(x)$ represented by equation (1).

Hereinafter, N denotes the number of state variables (total number of state variables), and the state variables $x_i$ (i=1 to N) or the state variables $x_1$ to $x_N$ denote the N state variables. A state x denotes a combination of the values of the state variables $x_1$ to $x_N$. The following description will be given on the assumption that the state holding unit 11 holds local fields $h_i$ (i=1 to N) represented by equation (2); however, the local fields $h_i$ may be held by the energy change computing unit 12.

The state holding unit 11 is, for example, a register, a static random-access memory (SRAM), or the like.

When a state transition occurs in response to a change in any of the values of the state variables $x_1$ to $x_N$, the energy change computing unit 12 computes, for the state transition, a value of the change in energy (hereinafter referred to as energy change $\Delta E_i$) based on a weight value selected based on an update index value.

The energy change $\Delta E_i$ is represented by equation (2) above. The energy change computing unit 12 successively computes the energy change $\Delta E_i$ by multiplying the local field $h_i$ by a sign factor (+1 or −1) in accordance with the value $\Delta x_i$. A change $\Delta h_i$ in the local field $h_i$ at the time of the state variable $x_j$ changing from 0 to 1 is represented by $+W_{ij}$, whereas the change $\Delta h_i$ in the local field $h_i$ at the time of the state variable $x_j$ changing from 1 to 0 is represented by $-W_{ij}$. Therefore, the local field $h_i$ does not have to be recomputed every time through a matrix operation, and the weight value $W_{ij}$ may be added or subtracted for the change caused by bits that change in response to the state transition. The energy change computing unit 12 causes the state holding unit 11 to hold the local field $h_i$ that has been computed (or updated).

Such an energy change computing unit 12 may be implemented using, for example, a storage unit (such as a register or an SRAM) that stores the weight value $W_{ij}$ or the like, a selector, a multiplier, an adder, and so on. In the following description, it is assumed that the energy change computing unit 12 outputs the index values i (i=1 to N) together with the N energy changes $\Delta E_i$ (i=1 to N) (hereinafter sometimes referred to as energy changes $\Delta E_1$ to $\Delta E_N$).

The offset control unit 13 determines an, offset value $E_{off}$ based on the energy changes $\Delta E_1$ to $\Delta E_N$ so that at least one of the state transitions is allowed, and outputs a plurality of evaluation values obtained by adding the offset value $E_{off}$ to the energy changes $\Delta E_1$ to $\Delta E_N$. The offset control unit 13 outputs the offset value $E_{off}$ every certain number of trials. An example of the offset control unit 13 and a method for determining the offset value $E_{off}$ will be described later.

The comparing unit 14 outputs a plurality of flag values $F_1, F_2, \ldots, F_N$ indicating whether to allow the respective state transitions (state transition candidates), based on results of comparing the plurality of evaluation values with a threshold determined based on a temperature value T and a value of a random number. The comparing unit 14 is capable of causing the state transition to be allowed with the allowable probability $A(\Delta E)$ represented by equation (3) as a result of such processing. An example of the comparing unit 14 and a reason why the state transition is allowable with the allowable probability $A(\Delta E)$ will be described later. In the following description it is assumed that the sampling operation is performed at a certain temperature (which means that the temperature value T is a fixed value); however, the temperature may be changed.

The flag counting unit 15 counts the number of flag values each indicating allowance of the corresponding state transition among the flag values $F_1$ to $F_N$, and outputs, every certain number of trials, the number of flag values (count value $N_f$) counted. An example of the flag counting unit 15 will be described later.

The selecting unit 16 selects one of the flag values $F_1$ to $F_N$ and outputs, as the update index value, the index value corresponding to the selected one of the flag values. An example of the selecting unit 16 will also be described later.

The control unit 17 controls each unit of the sampling apparatus 10. For example, the control unit 17 determines whether or not the number of trials has reached a certain number of trials. When the number of trials has reached the certain number of trials, the control unit 17 causes the state holding unit 11 to output the state at the time and causes the offset control unit 13 to output the offset value $E_{off}$. The control unit 17 causes the flag counting unit 15 to determine the count value $N_f$ at that time. The control unit 17 supplies the temperature value T to the comparing unit 14.

The control unit 17 may be implemented by, for example, an application-specific electronic circuit such as an application-specific integrated circuit (ASIC) or a held-programmable gate array (FPGA). The control unit 17 may be a processor such as a central processing unit (CPU) or a digital signal processor (DSP). In such a case, the processor performs the processing described above by executing a program stored in a memory (not illustrated).

Based on the offset value $E_{off}$ output by the offset control unit 13 and the count value $N_f$ output by the flag counting unit 15, the number-of-trials computing unit 18 computes an expected value $<N_{trial}>$ (approximate value) of the number of trials $N_{trial}$ in which one state remains unchanged in the ordinary MCMC method. The number-of-trials computing unit 18 may be implemented by, for example, an application-specific electronic circuit such as an ASIC or FPGA, or a processor'such as a CPU or a DSP. The number-of-trials computing unit 18 may be provided outside the sampling apparatus 10, or the control unit 17 may compute the expected value $<N_{trial}>$ based on the offset value $E_{off}$ and the count value $N_f$.

A reason why the offset value $E_{off}$ and the count value $N_f$ are usable as values for use in determining the expected value $<N_{trial}>$ is as follows.

FIG. 1 illustrates an example of a distribution of a transition probability $\Gamma_i$ obtained using the ordinary MCMC method. In the ordinary MCMC method, a value obtained by adding up the transition probabilities $\Gamma_i$ for all the state variables (the probabilities of transition to another state in each trial (equation (4)) is less than 1. As described before, the reciprocal of the probability represented by equation (4) is the expected value $<N_{trial}>$ of the number of trials $N_{trial}$ in which one state remains unchanged in the ordinary MCMC method. The expected value $<N_{trial}>$ is equivalent to an expected value of a period (state-remaining-unchanged period) in which the current state remains unchanged.

In contrast, when the number of trials in which each state remains unchanged in the sampling apparatus 10 is equal to 1, a distribution of the selection probability of each state variable being selected as a target to be inverted is, for example, as follows.

Figure 2:
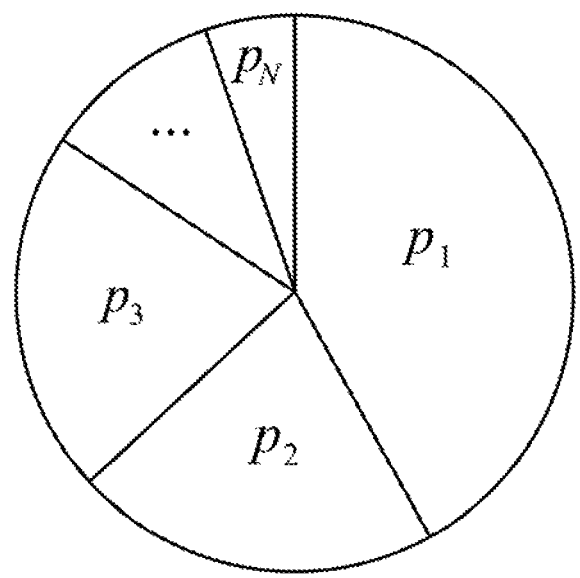
FIG. 2 is a diagram illustrating are example of a distribution of a selection probability when the number of trials in which each state remains unchanged is equal to 1.

FIG. 2 is a diagram illustrating an example of the distribution of the selection probability when the number of trials in which each state remains unchanged is equal to 1.

In FIG. 2, $p_1$ to $p_N$ denote the selection probabilities of the state variables $x_i$ (i=1 to N). When the number of trials in which each state remains unchanged is equal to 1, any of the state variables $x_i$ (i=1 to N) changes in each trial. Thus, a result of adding up the selection probabilities $p_1$ to $p_N$ is equal to 1. The selection probability $p_i$ may be represented by equation (6) below.

$$p_i = A(\Delta E_i) / \sum_{j=1}^{N} A(\Delta E_j) \quad (6)$$

The right side of equation (6) is the same as that of equation (5).

The sampling apparatus 10 uses the offset value $E_{off}$ that allows at least one of the state transitions to make the number of trials in which each state remains unchanged be equal to 1 as described above. Let $A(\Delta E_i - E_{off})$ denote the allowable probability obtained when the offset value $E_{off}$ is used. Then, the allowable probability $A(\Delta E_i - E_{off})$ may be represented by equation (7) below, based on equation (3) described before (in the case where the Metropolis method is used).

$$A(\Delta E_i - E_{off}) = \exp(\beta \cdot E_{off}) A(\Delta E_i) \quad (7)$$

When the inverse temperature $\beta$ and the offset value $E_{off}$ are positive values, the allowable probability $A(\Delta E_i - E_{off})$ is a probability obtained by multiplying the original allowable probability $A(\Delta E_i)$ by a coefficient $\exp(\beta \cdot E_{off})$ which is greater than or equal to 1. For this reason, when the allowable probability $A(\Delta E_i - E_{off})$ is used, the percentages of the allowable probabilities of the respective state transitions do not change from those in the case where the original allowable probabilities $A(\Delta E_i)$ are used.

The expected value $<N_{trial}>$ may be represented by equation (8) using equation (7).

$$\begin{aligned}\langle N_{trial}\rangle &= N \Big/ \sum_{i=1}^{N} A(\Delta E_i) \\ &= \exp(\beta \cdot E_{off}) \cdot N \Big/ \sum_{i=1}^{N} A(\Delta E_i - E_{off}) \\ &= \exp(\beta \cdot E_{off}) \cdot N / \langle N_f \rangle \approx \exp(\beta \cdot E_{off}) \cdot N / N_f\end{aligned} \quad (8)$$

For example, a value $<N_f>$ obtained by adding up the allowable probabilities $A(\Delta E_i - E_{off})$ for the state variables $x_1$ to $x_N$ may be approximated by the count value $N_f$ which is the number of flag values indicating allowance of the state transition.

In equation (8), the inverse temperature $\beta$ is a fixed value (because the temperature value T is a fixed value), and the total number of state variables N is also a fixed value. Thus, if the offset value $E_{off}$ and the count value $N_f$ at a sampling timing are obtained, the expected value $<N_{trial}>$ at the sampling timing may be determined as an approximate value.

The sampling apparatus 10 makes the number of trials in which each state remains unchanged to 1 by using the offset value $E_{off}$ and outputs (samples), every certain number of trials, the state, the offset value $E_{off}$, and the count value $N_f$. As a result of the weighting based on the expected value $<N_{trial}>$ that is obtained from the offset value $E_{off}$ and the count value $N_f$ in the above-described manner, the number of trials in which the obtained state remains unchanged in the MCMC method is determined, which, enables reproduction of the probability process of the ordinary MCMC method.

FIG. 1 illustrates a graph of an example of relationships between the energy E and the number of trials in the case where the ordinary MCMC method is used and in the case where the sampling apparatus 10 is used. As illustrated in FIG. 1, for example, a state-remaining-unchanged period in which a state x having certain energy Ea remains unchanged is a period corresponding to one trial in the case where the sampling apparatus 10 is used, whereas the state-remaining-unchanged period is a period corresponding to the expected value $<N_{trial}>$ in the case where the ordinary MCMC method is used. If the expected value $<N_{trial}>$ is known, the probability process of the ordinary MCMC method is successfully reproduced as described above.

For example, since sampling according to the ordinary MCMC method is successfully reproduced, more accurate sampling may be implemented than, in the case where the optimization apparatus of the related art is used as a sampling apparatus. Consequently, a sample according to the Boltzmann distribution may be obtained.

Most of the theories of machine learning are based on the assumption that a sample has the Boltzmann distribution. By using the sampling apparatus 10 as described above, a sample suitable for machine learning is obtainable.

The state transition occurs in each trial and substantially the same accuracy is practically achieved by one sampling operation as that achieved in the case where sampling is performed a plurality of number of times. Therefore, the high-speed computation processing is not impaired as compared with the case where the optimization apparatus of the related art is used as a sampling apparatus.

Examples of the individual units of the sampling apparatus 10 will be described below.

Examples of State Holding Unit 11 and Energy Change Computing Unit 12

Figure 3:
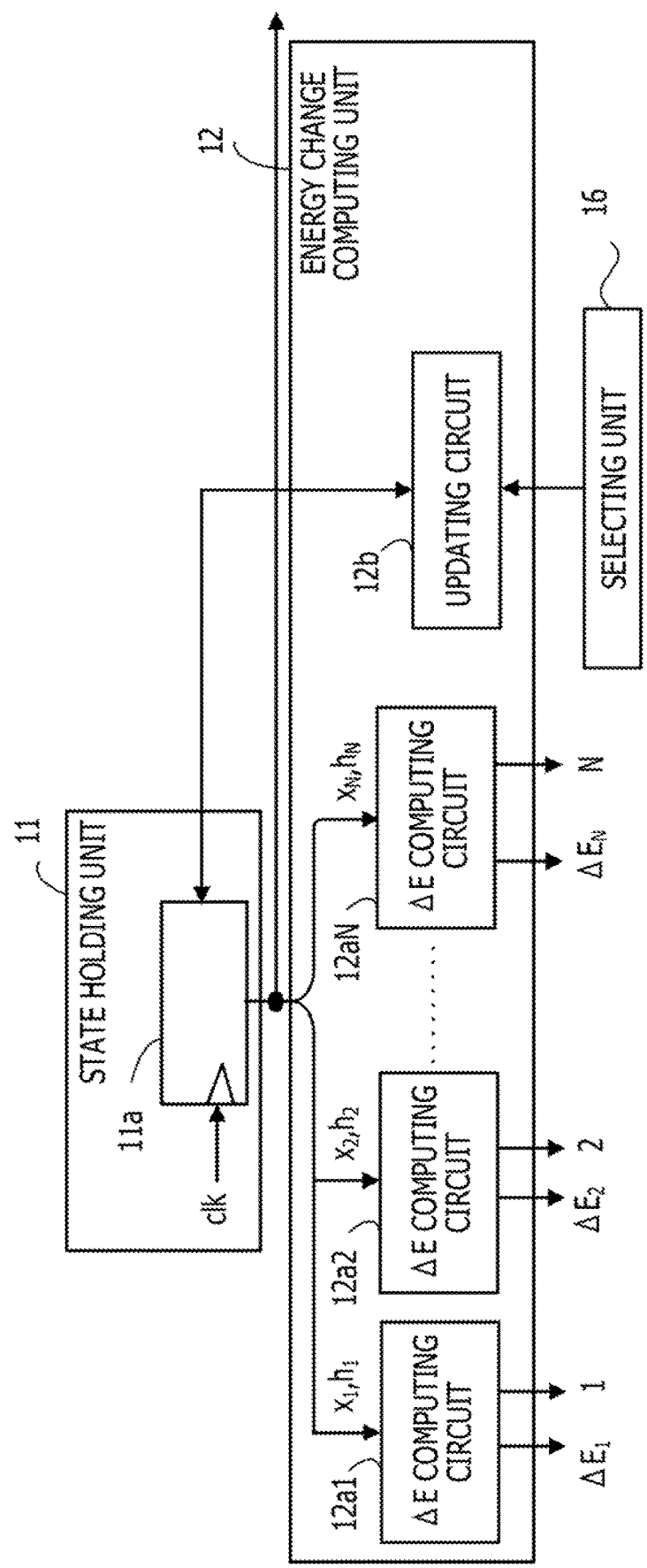
FIG. 3 is a diagram illustrating an example of a state holding unit and an example of an energy change computing unit.

FIG. 3 is a diagram illustrating an example of the state holding unit and an example of the energy change computing unit.

The state holding unit 11 includes a register 11a that holds the values of the state variables $x_1$ to $x_N$ and the local fields $h_1$ to $h_N$. The register 11a receives, in synchronization with a clock signal clk, one of the state variables $x_1$ to $x_N$ and the local fields $h_1$ to $h_N$ which have been updated by the energy change computing unit 12. The clock signal clk is supplied to the register 11a from a clock signal generating circuit (not illustrated). For example, the state holding unit 11 outputs, every certain number of trials, the values of the plurality of state variables to outside of the sampling apparatus 10 under the control of the control unit 17 illustrated in FIG. 1.

The energy change computing unit 12 includes ΔE computing circuits 12a1, 12a2, . . . , 12aN, and an updating circuit 12b.

Each of the ΔE computing circuits 12a1 to 12aN reads a corresponding one of the values of the state variables $x_1$ to $x_N$ and a corresponding one of the local fields $h_1$ to $h_N$ from the state holding unit 11, and computes a corresponding one of the energy changes $\Delta E_1$ to $\Delta E_N$. For example, the ΔE computing circuit 12a1 reads the value of the state variable $x_1$ and the local field $h_1$ from the state holding unit 11, and computes the energy change $\Delta E_1$ that occurs due to the change in the value of the state variable $x_1$. The ΔE computing circuit 12aN reads the value of the state variable $x_N$ and the local field $h_N$ from the state holding unit 11, and computes the energy change $\Delta E_N$ that occurs due to the change in the value of the state variable $x_N$.

Since the energy changes $\Delta E_i$ (i=1 to N) may be represented by equation (2), the ΔE computing circuits 12a1 to 12aN may be implemented, for example, using multipliers that multiply the local fields $h_1$ to $h_N$ by the sign factor (+1 or −1) in accordance with the values of the state variables $x_1$ to $x_N$, respectively.

Each of the ΔE computing circuits 12a1 to 12aN outputs a corresponding one of the index values i (i=1 to N). For example, the ΔE computing circuit 12a1 outputs the index value of 1, and the ΔE computing circuit 12aN outputs the index value of N. Each of the ΔE computing circuits 12a1 to 12aN includes a holding unit (register, for example) that holds the index value.

When receiving the update index value from the selecting unit 16, the updating circuit 12b changes the value of the state variable corresponding to the update index value, and updates the local fields $h_1$ to $h_N$ based on the change. The updated values are written in the state holding unit 11.

For example, when the update index value is j, the updating circuit 12b changes the state variable $x_j$ to $1-x_j$. Then, the updating circuit 12b updates the local fields $h_i$ (i=1 to N) to $h_i + W_{ij} \cdot \Delta x_j$.

The updating circuit 12b acquires the current values, of the state variables $x_i$ (i=1 to N) and the local fields $h_i$ from the state holding unit 11 to perform the updating processing described above. The weight value $W_{ij}$ is stored in a storage unit (not illustrated), and the updating circuit 12b acquires the weight value $W_{ij}$ from the storage unit.

Such, an updating circuit 12b may be implemented using a storage unit (such as a register or SRAM) that stores the weight value $W_{ij}$ or the like, a selector, a multiplier, an adder, and so on.

Examples of Offset Control Unit 13 and Comparing Unit 14

Figure 4:
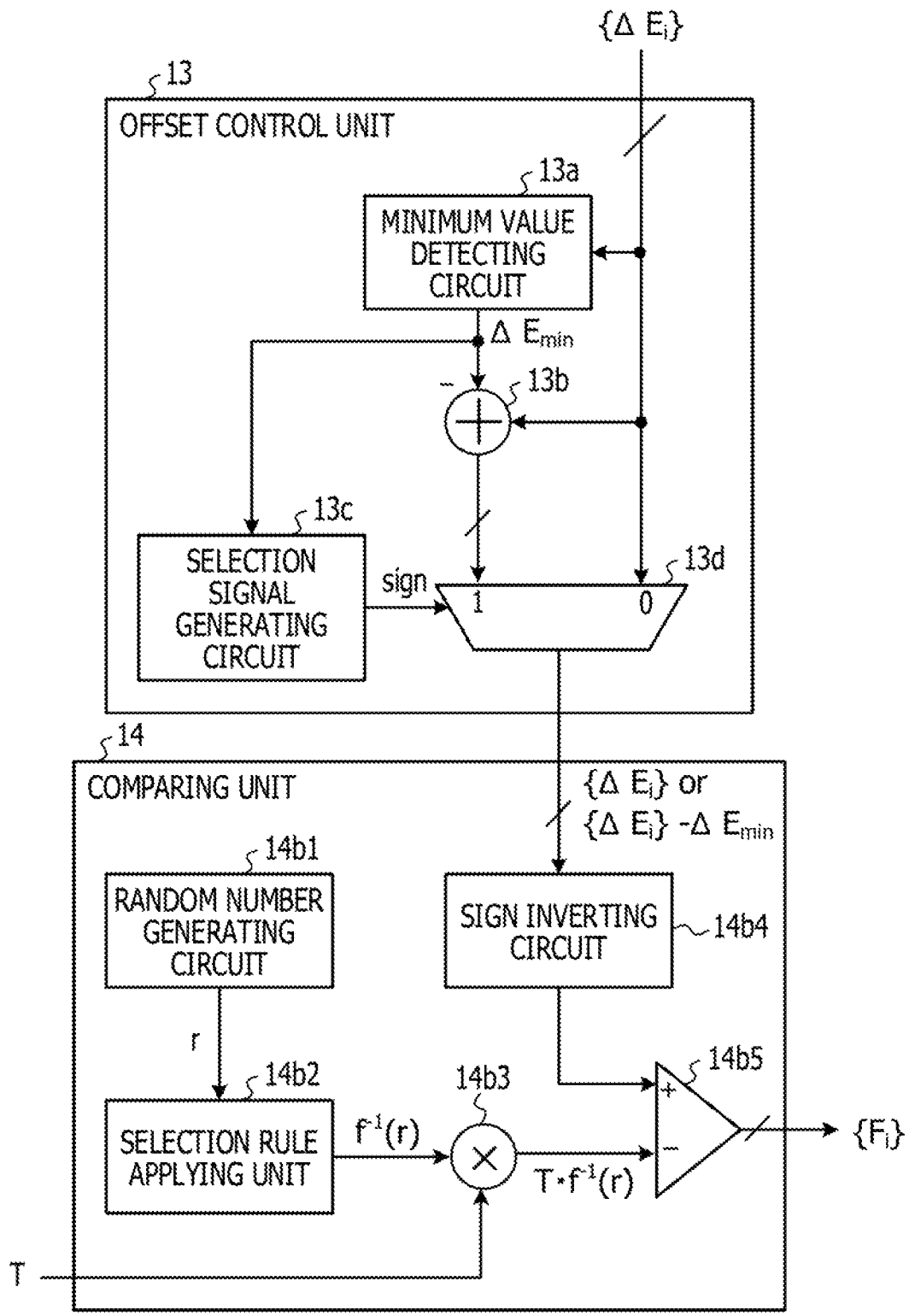
FIG. 4 is a diagram illustrating an example of an offset control unit and an example of a comparing unit.

FIG. 4 is a diagram illustrating an example of the offset control unit and an example of the comparing unit. In FIG. 4, the aforementioned energy changes $\Delta E_1$ to $\Delta E_N$ are collectively referred to as $\{\Delta E_i\}$, and the aforementioned flag values $F_1$ to $F_N$ are collectively referred to as $\{F_i\}$.

The offset control unit 13 includes a minimum value detecting circuit 13a, an adding circuit 13b, a selection signal generating circuit 13c, and a selector 13d.

The minimum value detecting circuit 13a detects a minimum value $\Delta E_{min}$ of the energy changes $\Delta E_1$ to $\Delta E_N$.

The adding circuit 13b is an arithmetic circuit that subtracts, as an offset value, the minimum value $\Delta E_{min}$ from the energy changes $\Delta E_1$ to $\Delta E_N$ (that is, adds $-\Delta E_{min}$ to the energy changes $\Delta E_1$ to $\Delta E_N$). A subtracting circuit may be used instead of the adding circuit 13b.

The selection signal generating circuit 13c generates a selection signal sign. When the minimum value $\Delta E_{min}$ is smaller than 0, the selection signal generating circuit 13c generates a selection signal sign (assumed to be 0 hereinafter) that causes the selector 13d to select the energy changes $\Delta E_1$ to $\Delta E_N$. When the minimum value $\Delta E_{min}$ is greater than or equal to 0, the selection signal generating circuit 13c generates a selection signal sign (assumed to be 1 hereinafter) that causes the selector 13d to select the values computed by the adding circuit 13b.

When the selection signal sign is 0 the selector 13d selects the energy changes $\Delta E_1$ to $\Delta E_N$ ($\{\Delta E_i\}$). When the selection signal sign is 1, the selector 13d selects the values computed by the adding circuit 13b, that is $\{\Delta E_i\} - \Delta E_{min}$. The selector 13d outputs the selected values as evaluation values.

When the offset control unit 13 illustrated in FIG. 4 is used, the offset value $E_{off}$ may be represented by $E_{off} = \max[0, \min(\Delta E_i)]$. This indicates that when the minimum value $\Delta E_{min}$ of the energy changes $\Delta E_1$ to $\Delta E_N$ is 0 or greater, $E_{off}$ is equal to $\Delta E_{min}$; otherwise $E_{off}$ is equal to 0.

By using such an offset value $E_{off}$, the state transition is allowed for at least one of the state variables $x_1$ to $x_N$. A reason for this will be described below.

Figure 5:
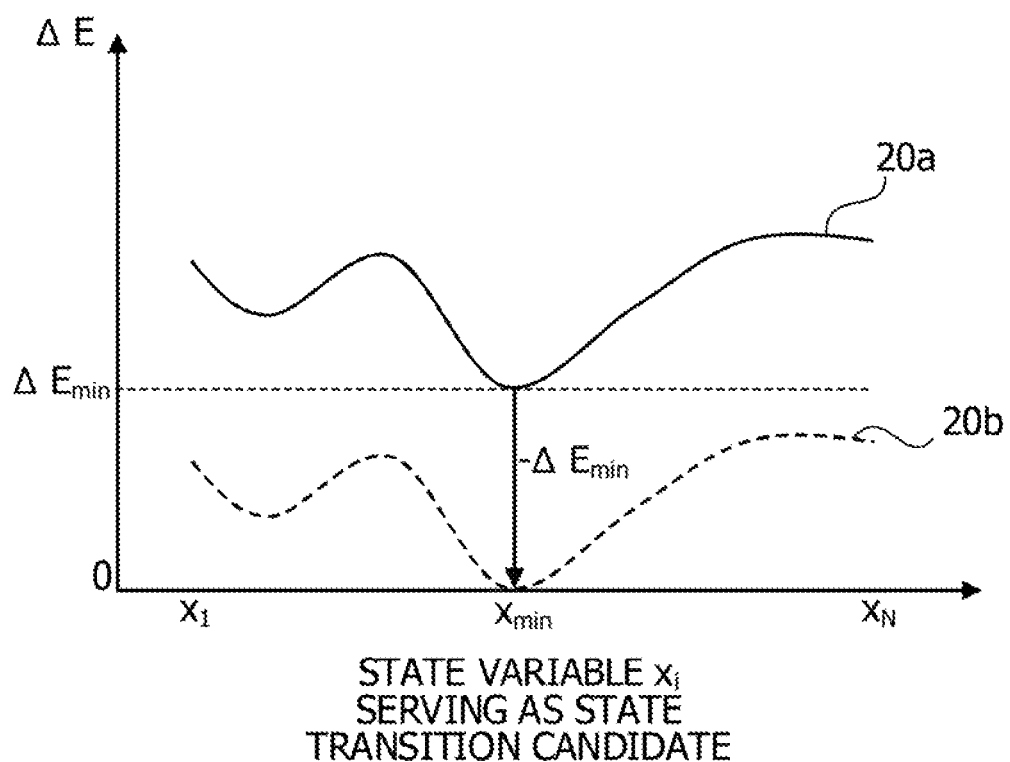
FIG. 5 is a diagram illustrating an example in which an offset value is used.

FIG. 5 is a diagram illustrating an example in which the offset value is used. In FIG. 5, the horizontal axis represents the state variable $x_i$ serving as a candidate for the state transition, and the vertical axis represents the energy change ΔE.

A waveform 20a indicates an example of the energy changes $\{\Delta E_i\}$ in response to changes in the respective state variables $x_1$ to $x_N$. In the example illustrated in FIG. 5, the energy change ΔE in response to a change in the value of a state variable $x_{min}$ in among the energy, changes $\{\Delta E_i\}$ is the minimum value $\Delta E_{min}$, which is greater than 0. A waveform 20b indicates the energy changes ΔE obtained by subtracting the minimum value $\Delta E_{min}$ from the energy changes $\{\Delta E_i\}$ indicated by the waveform 20a.

Since the minimum value of the energy change ΔE in the waveform 20b is equal to 0, the allowable probability A(ΔE) for the state transition in which the value of the state variable $x_{min}$ changes is equal to 1. This indicates that the state transition is allowed for at least the state variable $x_{min}$ among the state variables $x_1$ to $x_N$.

As described above, even when the minimum value $\Delta E_{min}$ of the energy changes $\Delta E_1$ to $\Delta E_N$ is greater than 0, the state transition is allowed for at least one of the state variables $x_1$ to $x_N$ by subtracting the offset value $E_{off}=\Delta E_{min}$ from the energy changes $\{\Delta E_i\}$.

The description returns to the description in FIG. 4.

The comparing unit 14 includes a random number generating circuit 14b1, a selection rule applying unit 14b2, a multiplying circuit 14b3, a sign inverting circuit 14b4, and a comparing circuit 14b5.

The random number generating circuit 14b1 generates a random number value r which is a uniform random number that is greater than 0 and less than or equal to 1. The random number generating circuit 14b1 may be implemented using, for example, a Mersenne twister, a linear-feedback shift register (LFSR), or the like.

The selection rule applying unit 14b2 outputs a value based on a selection rule (the aforementioned Metropolis method or Gibbs method).

A circuit that outputs a flag (=1) indicating allowance of the state transition that causes the energy change $\Delta E$ with the allowable probability $A(\Delta E)$ represented by equation (3) above may be implemented by a comparator that outputs a value based on a result of comparing the allowable probability $A(\Delta E)$ with the random number value r.

The same function may also be implemented even when the following modification is made. Even when the same monotonically increasing function is applied to two numbers, a magnitude relationship therebetween does not change. Therefore, even when the same monotonically increasing function is applied to two inputs of the comparator, the output of the comparator does not change. For example, the allowable probability $A(\Delta E)$ is represented by $f(-\beta \cdot \Delta E)$. An inverse function $f^{-1}(-\beta \cdot \Delta E)$ of the allowable probability $f(-\beta \cdot \Delta E)$ may be used as a monotonically increasing function applied to the allowable probability $f(-\beta \cdot \Delta E)$, and $f^{-1}(r)$ obtained by replacing $-\beta \cdot \Delta E$ of $f^{-1}(-\beta \cdot \Delta E)$ with r may be used as a monotonically increasing function applied to the random number value r. This indicates that, in the above case, a circuit having substantially the same function as the above-described comparator may be a circuit that outputs 1 when $-\beta \cdot \Delta E$ is greater than $f^{-1}(r)$. Since $\beta$ is equal to 1/T and the temperature value T is a positive value, the circuit may be a circuit that outputs 1 when $-\Delta \Delta E$ is greater than $T \cdot f^{-1}(r)$.

The selection rule applying unit 14b2 outputs the value of $f^{-1}(r)$ by using a conversion table for converting the input random number value r into the value of $f^{-1}(r)$ described above. In the case where the Metropolis method is used, $f^{-1}(r)$ is equal to $\log(r)$. The conversion table is stored in, for example, a memory such as a random-access memory (RAM) or a flash memory.

The multiplying circuit 14b3 outputs, as a threshold, a product $(T \cdot f^{-1}(r))$ of the temperature value T supplied thereto from the control unit 17 and $f^{-1}(r)$. The threshold $T \cdot f^{-1}(r)$ corresponds to thermal excitation energy.

The sign inverting circuit 14b4 inverts the sign of the evaluation value $\{\Delta E_i\}$ or $\{E_i\}-\Delta E_{min}$, and outputs $-\{\Delta E_i\}$ or $-\{\Delta E_i\}+\Delta E_{min}$.

The comparing circuit 14b5 compares $-\{\Delta E_i\}$ or $-\{\Delta E_i\}+\Delta E_{min}$ with the threshold $T \cdot f^{-1}(r)$. When $-\{\Delta E_i\}$ or $-\{\Delta E_i\}+\Delta E_{min}$ is greater than the threshold $T \cdot f^{-1}(r)$, the comparing circuit 14b5 outputs 1 as the flag value $\{F_i\}$. When $-\{\Delta E_i\}$ or $-\{\Delta E_i\}+\Delta E_{min}$ is less than or equal to, the threshold $T \cdot f^{-1}(r)$, the comparing circuit 14b5 outputs 0 as the flag value $\{F_i\}$.

Example of Flag Counting Unit 15

As examples of the flag counting unit 15 illustrated in FIG. 1, two flag counting units 15a and 15b will be described below.

Figure 6:
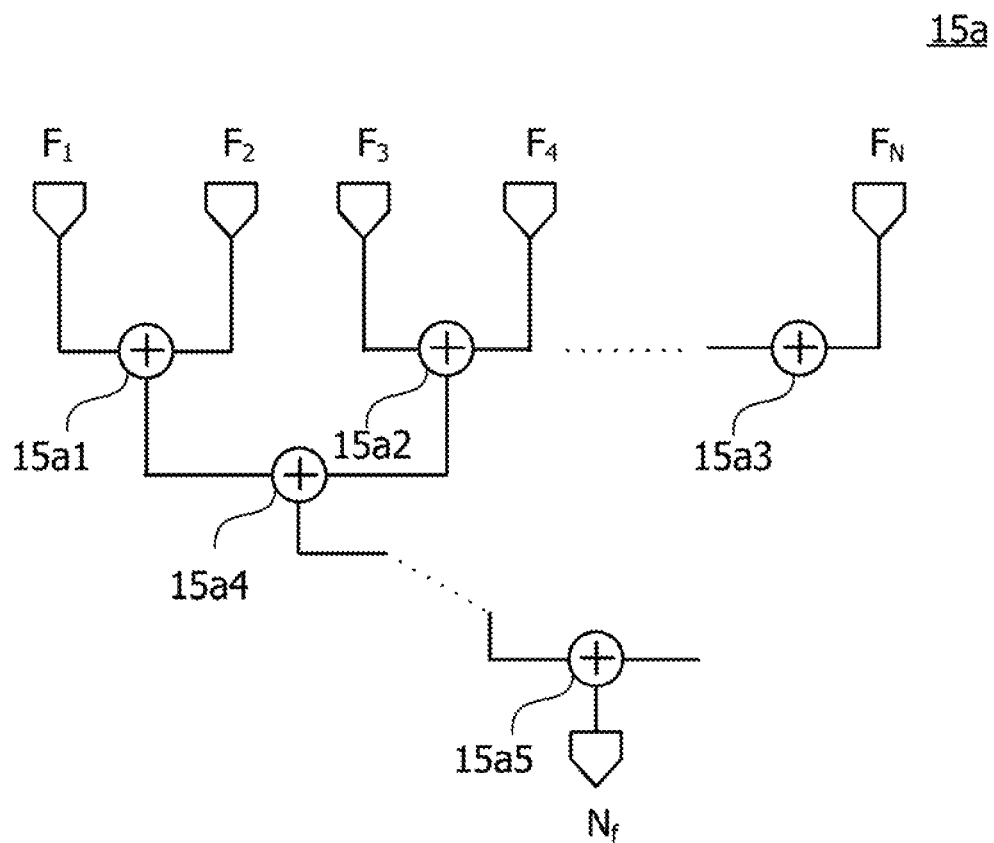
FIG. 6 is a diagram illustrating an example of a flag counting unit.

FIG. 6 is a diagram illustrating an example of the flag counting unit.

The flag counting unit 15a includes a plurality of adding circuits (such as adding circuits 15a1, 15a2, 15a3, 15a4, and 15a5), which are arranged in a tree shape including a plurality of stages.

Each of the adding circuits in the first stage outputs an addition result obtained by adding two flag values. For example, the adding circuit 15a1 outputs an addition result obtained by adding the flag values $F_1$ and $F_2$, and the adding circuit 15a2 outputs an addition result obtained by adding the flag values $F_3$ and $F_4$. Each of the adding circuits in the second and subsequent stages outputs an addition result obtained by adding the output values of two, adding circuits in the previous stage. For example, the adding circuit 15a4 in the second stage outputs an addition result obtained by adding the output values of the adding circuits 15a1 and 15a2 in the first stage. An addition result output by the adding circuit 15a5 in the last stage is the count value $N_f$.

Each of the adding circuits in the first stage adds two 1-bit flag values and outputs a 2-bit addition result. Each of the adding circuits in the second stage adds the 2-bit output values output by the two adding circuits, and outputs a 3-bit addition result. In the case of N=1024, the adding circuit 15a5 in the last stage (tenth stage) adds the 10-bit output values output by the two adding circuits in the previous stage and outputs the 11-bit count value $N_f$.

Figure 7:
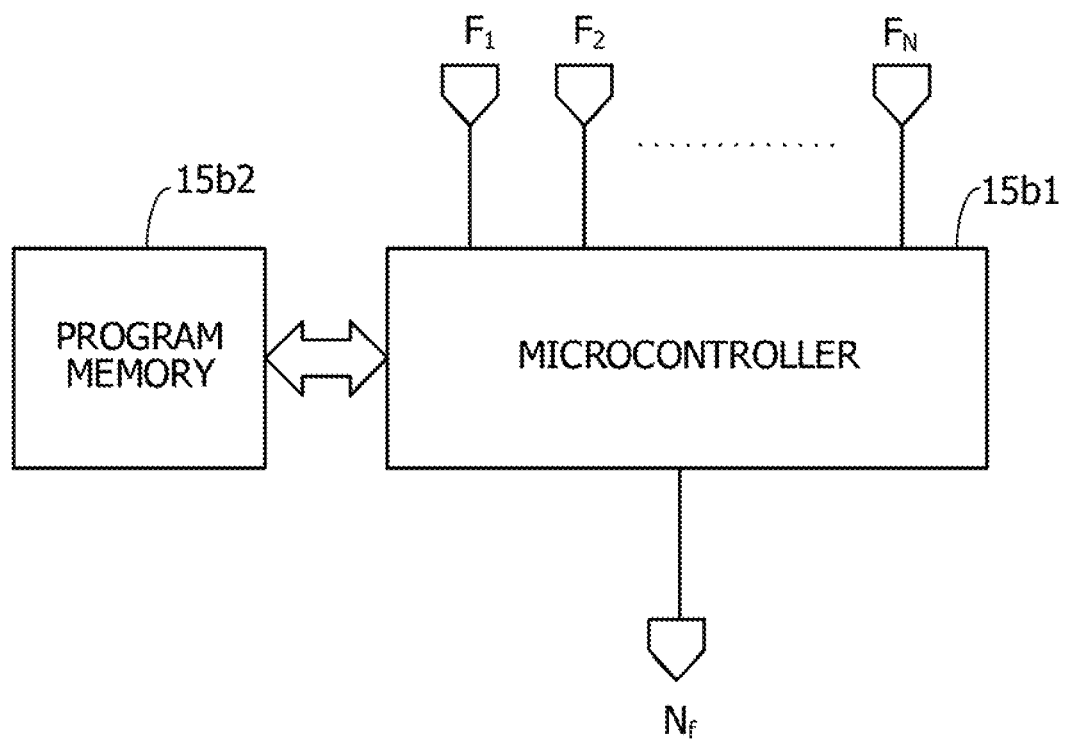
FIG. 7 is a diagram illustrating another example of the flag counting unit.

FIG. 7 is a diagram illustrating another example of the flag counting unit.

The flag counting unit 15b includes a microcontroller 15b1 and a program memory 15b2.

The microcontroller 15b1 reads and executes a program stored in the program memory 15b2 to count the number of flag values that are equal to 1 among the flag values $F_1$ to $F_N$, and outputs the count value $N_f$ that is the counting result.

Since the sampling apparatus 10 performs sampling usually at intervals (sampling intervals) of 1000 clock cycles or more, the microcontroller 15b1 having a relatively slow processing speed and the program memory 15b2 having a relatively small capacity may be used.

Example of Selecting Unit 16

Figure 8:
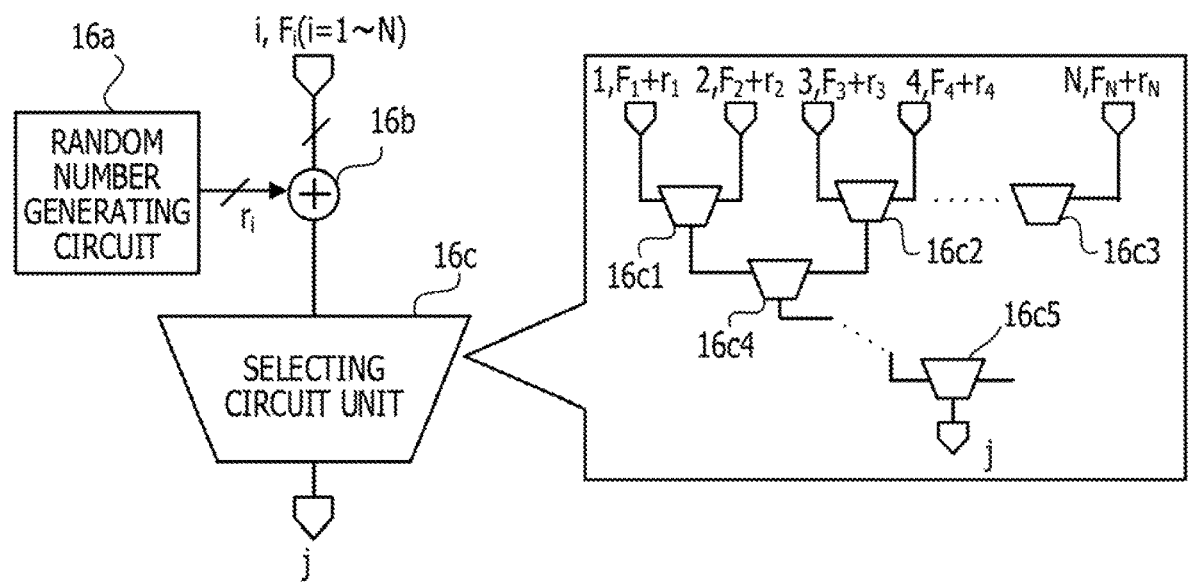
FIG. 8 is a diagram illustrating an example of a selecting unit.

FIG. 8 is a diagram illustrating an example of the selecting unit.

The selecting unit 16 includes a random number generating circuit 16a, an adding circuit 16b, and a selecting circuit unit 16c.

The random number generating circuit 16a generates, for example, random number values $r_i$ which are uniform random numbers of $0<r_i<1$, using different seeds for different index values i (i=1 to N). The random number generating circuit 16a may be implemented using, for example, a Mersenne twister, an LFSR, or the like.

The adding circuit 16b outputs addition results each obtained by adding a corresponding one of the plurality of random number values $r_i$ (=1 to N) to each of the flag values $F_1$ to $F_N$, together with the index value corresponding to the one of the flag values $F_1$ to $F_N$.

The selecting circuit unit 16c includes a plurality of selecting circuits (such as selecting circuits 16c1, 16c2, 16c3, 16c4, and 16c5) which are arranged in a tree shape including a plurality of stages.

Each of the selecting circuits in the first stage selects and outputs a greater one of addition results of two flag values and the corresponding index value. For example, when the addition result $F_1+r_1$ is greater than the addition result $F_2+r_2$, the selecting circuit 16c1 outputs $F_1+r_1$ and the index value of 1. When the addition result $F_1+r_1$ is less than the addition result $F_2+r_2$, the selecting circuit 16c1 outputs $F_2+r_2$ and the index value of 2.

Each of the selecting circuits in the second and subsequent stages selects and outputs a greater one of addition results selected by the two selecting circuits in the previous stage and the corresponding index value. For example, the selecting circuit 16c4 in the second stage selects and outputs a greater one of the addition results selected by the selecting circuits 16c1 and 16c2 in the first stage and the corresponding index value. The selecting circuit 16c5 in the last stage outputs, as the update index value, the index value of j corresponding to a greater one of the addition results selected by the two selecting circuits in the previous stage.

As described above, the selecting unit 16 successfully selects, at random with an equal probability, a flag value that is equal to 1 from among the flag values $F_1$ to $F_N$, by selecting one of the flag values $F_1$ to $F_N$, based on the magnitude relationships between the addition results.

Example of Operation

An example of an operation performed by the sampling apparatus 10 will be described below.

In the following example, it is assumed that the sampling operation is performed at the temperature value T that is fixed.

Figure 9:
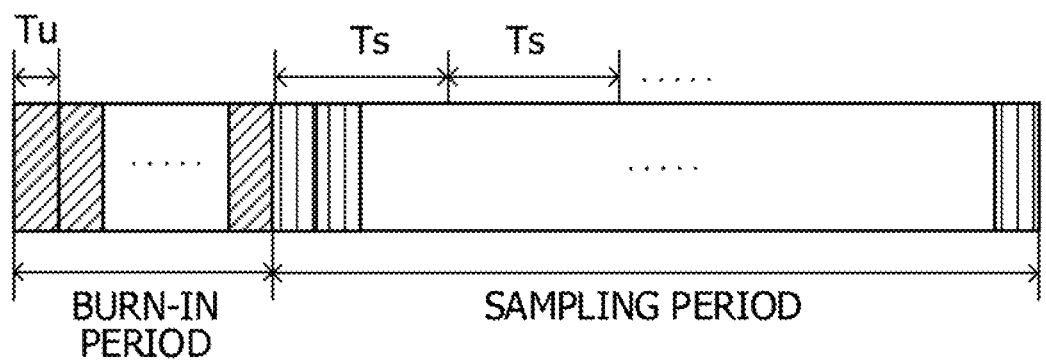
FIG. 9 is a diagram illustrating an example of sampling timing.

FIG. 9 is a diagram illustrating an example of a sampling timing.

In FIG. 9, a period Tu indicates a period of one trial (a state updating process). The sampling apparatus 10 starts sampling after the trial is performed a certain number of times (corresponding to a burn-in period). The burn-in period is a period up until the state reaches the equilibrium state, and the number of trials corresponding to the burn-in period is set in advance.

In a sampling period, the sampling apparatus 10 performs, every certain number of trials (at a sampling interval Ts), sampling (for example, outputs the state x, the offset value $E_{off}$, the count value $N_f$, and so on. The number of trials corresponding to the sampling interval Ts is set in advance.

Figure 10:
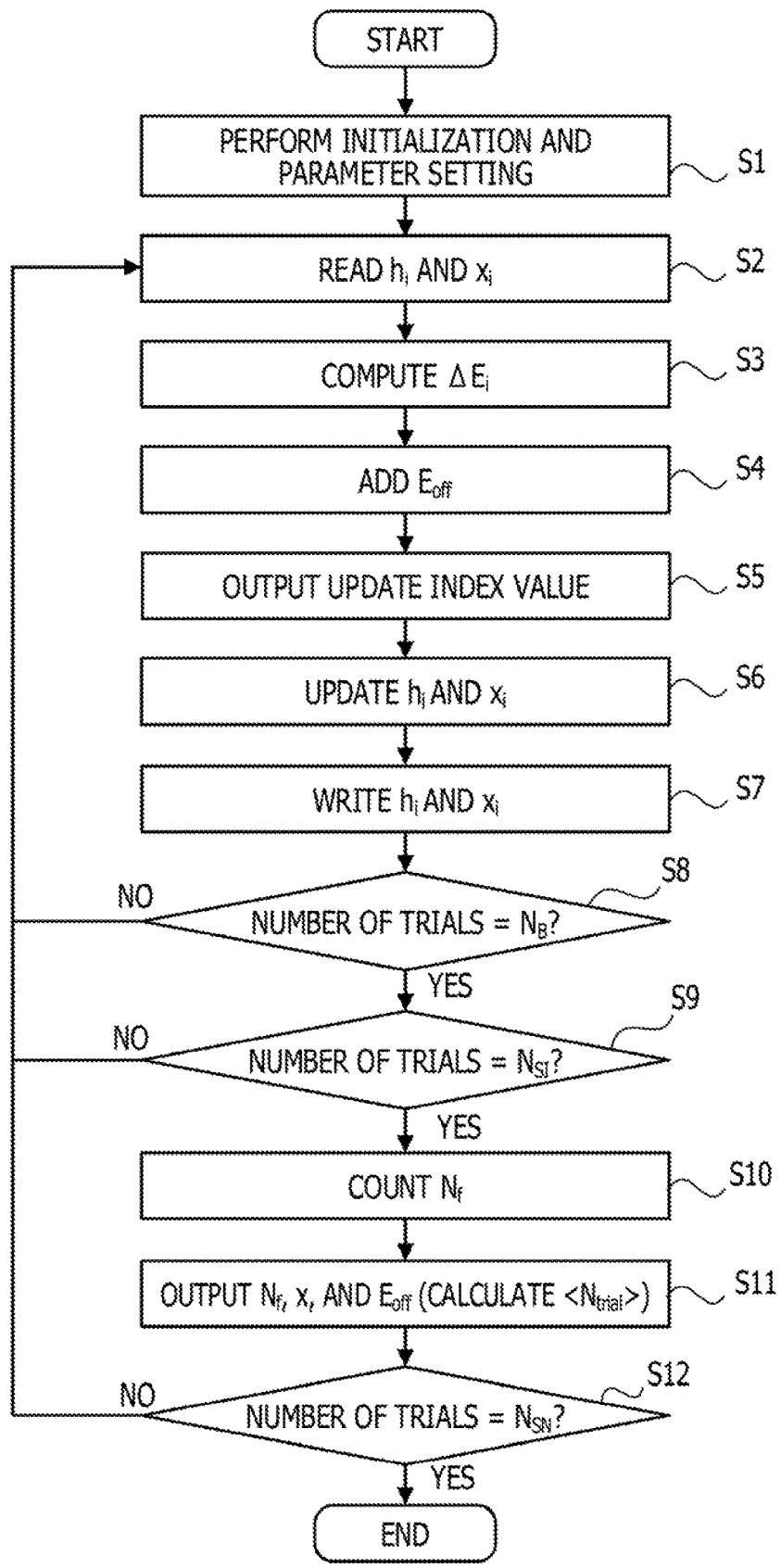
FIG. 10 is a flowchart illustrating an example of a flow of a sampling operation.

FIG. 10 is a flowchart illustrating an example of a flow of the sampling operation.

First, initialization and parameter setting, are performed (step S1) In the processing of step S1, the control unit 17 computes the initial values of the local fields $h_i$ (i=1 to N), based on the weight value, the bias coefficient, and the initial values of the state variables $x_i$ (i=1 to N), for example. The weight value, the bias coefficient, and the initial values of the state variables $x_i$ (i=1 to N) are stored in advance, for example, in a storage unit (not illustrated), as information on the Ising model into which a combinatorial optimization problem subjected to computation is converted. The initial values of the state variables $x_i$ and the initial values of the local fields $h_i$ are held in the state holding unit 11.

The number of trials $N_B$ corresponding to the burn-in period, the number of trials $N_{SI}$ corresponding to the sampling interval Ts, and the number of trials $N_{SN}$ in which all the samples are obtained are also stored in advance in a storage unit (not illustrated), for example. In the processing of step S1, these parameters are set in the control unit 17.

The energy change computing unit 12 reads the values of the state variables $x_i$ and the local fields $h_i$ from the state holding unit 11 (step S2).

The energy change computing unit 12 then computes the energy changes $\Delta E_i$ (i=1 to N) as described above (step S3).

The offset control unit 13 adds the offset value $E_{off}$ described above to the energy changes $\Delta E_i$ supplied thereto from the energy change computing unit 12 (step S4).

As a result of the above-described processing performed by the comparing unit 14 and the selecting unit 16, the update index value for identifying the state variable for which the state transition is allowed is output (step S5).

The energy change computing unit 12 updates the value of the state variable $x_i$ identified by the update index value. Based on the update, the energy change computing unit 12 updates the local fields $h_i$ through the processing described above (step S6).

The updated values of the state variable $x_i$ and the local fields $h_i$ are written in the state holding unit 11 (step S7).

The control unit 17 determines whether or not the number of times the processing (trial) of steps S2 to S7 has been performed has reached the number of trials $N_B$ (step S8). If the number of times the processing of steps S2 to S7 has been performed has not reached the number of trials $N_B$, the processing is repeated from step S2.

If the number of times the processing of steps S2 to S7 has been performed has reached the number of trials $N_B$, the control unit 17 determines whether or not the number of times the processing of S2 to S7 has been performed has reached the number of trials $N_{SI}$ (step S9). If the number of times the processing of steps S2 to S7 has been performed has not reached the number of trials $N_{SI}$, the processing is repeated from step S2.

If the number of times the processing of steps S2 to S7 has been performed has reached the number of trials $N_{SI}$, the control unit 17 causes the flag counting unit 15 to determine the count value $N_f$ (step S10). The control unit 17 causes the flag counting unit 15 to output the count value $N_f$, causes the state holding unit 11 to output the state x, and causes the offset control unit 13 to output the offset value $E_{off}$ (step S11). Based, on the output offset value $E_{off}$ and the output count value $N_f$, the number-of-trials computing unit 18 computes the expected value $<N_{trial}>$ represented by equation (8).

The control unit 17 determines whether or not the number of times the processing of steps S2 to S7 has been performed has reached the number of trials $N_{SN}$ (step S12). If the number of times the processing of steps S2 to S7 has been performed has not reached the number of trials $N_{SN}$, the processing is repeated from step S2. If the number of times the processing of steps S2 to S7 has been performed has reached the number of trials $N_{SN}$, the control unit 17 ends the sampling operation.

The sampling apparatus 10 may also be used as an optimization apparatus. An example of an operation performed when the sampling apparatus 10 is used as an optimization apparatus will be described below.

Figure 11:
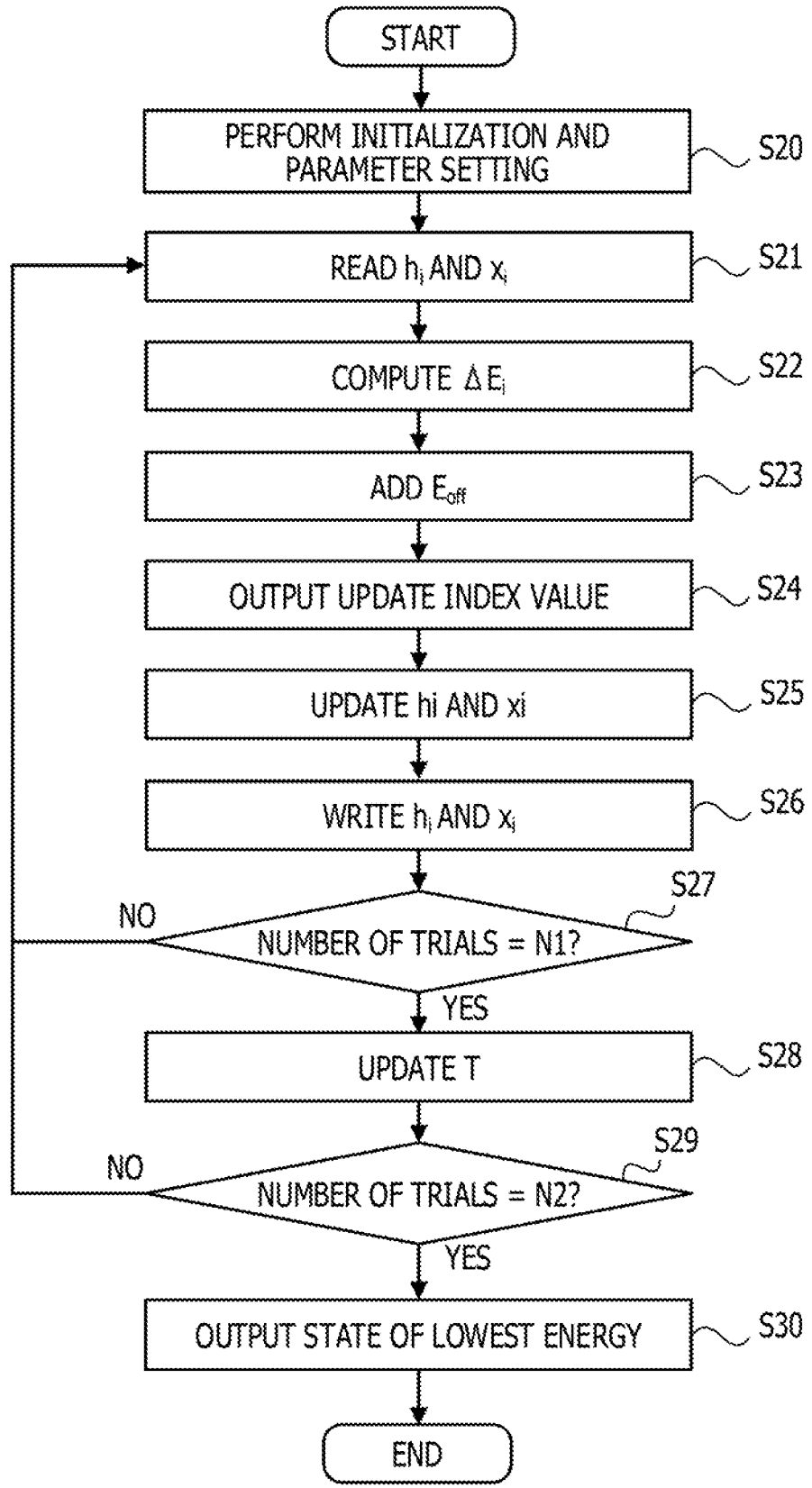
FIG. 11 is a flowchart illustrating an example of a flow of an optimization processing operation.

FIG. 11 is a flowchart illustrating an example of a flow of an optimization processing operation.

First, initialization and parameter setting are performed (step S20). In the processing of step S20, the control unit 17 computes the initial values of the local fields $h_i$ (i=1 to N) and so on as in the sampling operation.

In the processing of step S20, the control unit 17 sets the initial value of the temperature value T in the comparing unit 14 in accordance with a temperature change schedule that is stored in advance in a storage unit (not illustrated), for example. For example, the number of trials N1 at which the temperature value T is updated and the maximum number of trials N2 are stored in advance in the storage unit (not illustrated). These parameters are set in the control unit 17 in the processing of step S20.

The subsequent processing of steps S21 to S26 is substantially the same as the processing of steps S2 to S7 in the sampling operation illustrated in FIG. 10. However, for example, the control unit 17 computes the initial value of the energy E represented by equation (1), and updates the energy E using an energy change corresponding to the update index value (for example, the energy change $\Delta E_j$ in the case where the update index value is equal to j). The control unit 17 causes the storage unit (not illustrated) to hold the lowest energy up to this point and the state at that time.

After step S26, the control unit 17 determines whether or not the number of times the processing of steps S21 to S26 (trial) has been performed has reached the number of trials N1 (step S27). If the number of times the processing of steps S21 to S26 has been performed has not reached the number of trials N1, the processing is repeated from step S21.

If the number of times the processing of steps S21 to S26 has been performed has reached the number of trials N1, the control unit 17 updates the temperature value T to decrease in accordance with the temperature change schedule in order to implement simulated annealing (step S28).

The control unit 17 then determines whether or not the number of times the processing of steps S21 to S26 has been performed has reached the number of trials N2 (step S29). If the number of times, the processing of steps S21 to S26 has been performed has not reached the number of trials N2, the processing is repeated from step S21. If the number of times the processing of steps S21 to S26 has been performed has reached the number of trials N2, the control unit 17 outputs the state at the time of the lowest energy stored in the storage unit at that time, as a solution to the combinatorial optimization problem (step S30) and ends the optimization processing operation.

When the sampling apparatus 10 is used as an optimization apparatus, the state transition occurs in each trial as a result of using the offset value $E_{off}$ as described above. This consequently speeds up the search.

Second Embodiment

A sampling apparatus according to a second embodiment will be described below.

Counting the number of flag values that are equal to 1 as described above is equivalent to representing a mantissa portion and an exponent portion of the sum of the allowable probabilities $A(\Delta E_i)$ (i=1 to N), by using 1 bit and as exp $(-\beta \cdot E_{off})$, respectively. The sampling apparatus according to the second embodiment described below determines the count value $N_f$ from two kinds of flag values to compute a more accurate expected value $<N_{trial}>$.

Figure 12:
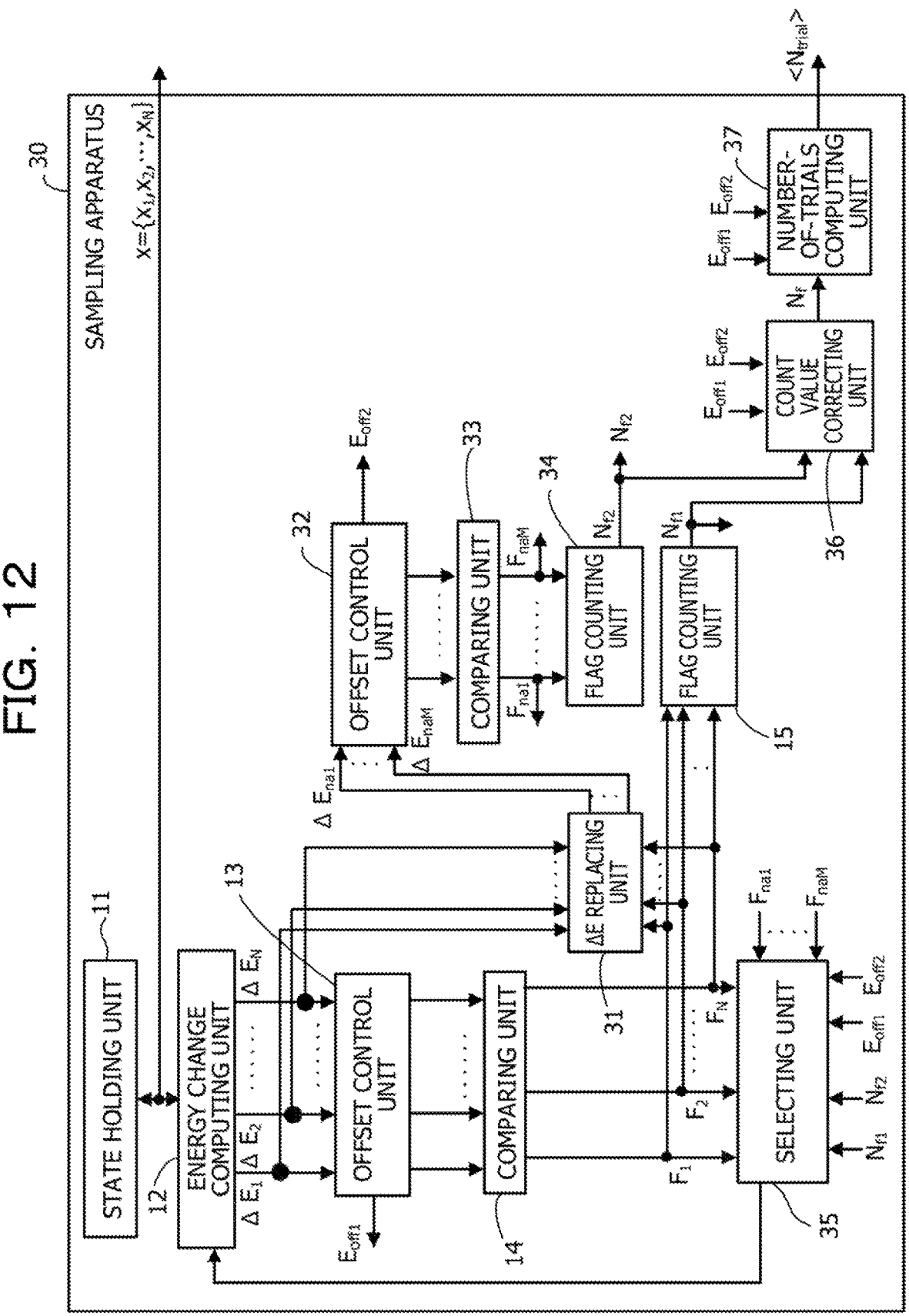
FIG. 12 is a diagram illustrating an example of a sampling apparatus according to a second embodiment.

FIG. 12 is a diagram illustrating an example of the sampling apparatus according to the second embodiment. In FIG. 12, the same components as those illustrated in FIG. 1 are assigned the same reference numerals. In FIG. 12, the control unit 17 illustrated in FIG. 1 is not illustrated. In the following description, the offset value $E_{off}$ output by the offset control unit 13 illustrated in FIG. 1 is referred to as an offset value $E_{off1}$, and the count value $N_f$ output by the flag counting unit 15 illustrated in FIG. 1 is referred to as a count value $N_{f1}$.

A sampling apparatus 30 according to the second embodiment includes a $\Delta E$ replacing unit 31, an offset control unit 32, a comparing unit 33, a flag counting unit 34, a selecting unit 35, a count value correcting unit 36, and a number-of-trials computing unit 37.

Based on the flag values $F_1$ to $F_N$, the $\Delta E$ replacing unit 31 outputs a plurality of non-allowable energy change values (hereinafter referred to as energy changes $\Delta E_{na1}$ to $\Delta E_{naM}$) for a plurality of state transitions which are determined to be not allowable among the energy changes $\Delta E_1$ to $\Delta E_N$. The $\Delta E$ replacing unit 31 may be implemented by, for example, a circuit that receives the energy changes $\Delta E_1$ to $\Delta E_N$ and the flag values $F_1$ to $F_N$, and selects energy changes having index values corresponding to index values of the flag values that are equal to 0 from among the energy changes $\Delta E_1$ to $\Delta E_N$.

The offset control unit 32 determines, based on the energy changes $\Delta E_{na1}$ to $\Delta E_{naM}$, an offset value $E_{off2}$ different from the offset value $E_{off1}$ such that at least one of a plurality of state transitions, which are not allowable in accordance with the flag values $F_1$ to $F_N$, is allowed. The offset control unit 32 outputs a plurality of evaluation values that are different from the plurality of evaluation values output by the offset control unit 13 and are obtained by adding the offset value $E_{off2}$ to the energy changes $\Delta E_{na1}$ to $\Delta E_{naM}$. The offset control unit 32 outputs the offset value $E_{off2}$ every certain number of trial. The offset control unit 32 may be implemented by substantially the same circuit as that of the offset control unit 13.

Based on results of comparing the plurality of evaluation values output by the offset control unit 32 with a threshold determined based on the temperature value T and a random number value, the comparing unit 33 outputs a plurality of flag values that are different from the flag values $F_1$ to $F_N$ and indicate whether or not to allow the respective state transitions, Hereinafter, the plurality of flag values output by the comparing unit 33 are referred to as flag values $F_{na1}$ to $F_{naM}$. The comparing unit 33 may be implemented by substantially the same circuit as that of the comparing unit 14.

The flag counting unit 34 outputs, every certain number of trials, a count value $N_{f2}$ that is different from the count value $N_{f1}$ and is obtained by counting the number of flag values (that are equal to 1) indicating allowance of the state transition among the flag values $F_{na1}$ to $F_{naM}$ output by the comparing unit 33. The flag counting unit 34 may be implemented by substantially the same circuit as that of the flag counting unit 15.

Based on the count values $N_{f1}$ and $N_{f2}$ and the offset varies $E_{off1}$ and $E_{off2}$, the selecting unit 35 selects one of a group of flag values that are equal to 1 among the flag values $F_1$ to $F_N$ and a group of flag values that are equal to 1 among the flag values $F_{na1}$ to $F_{naM}$ with a ratio of $N_{f1}:N_{f2}\exp[-\beta(E_{off1}-E_{off2})]$. The selecting unit 35 selects one flag value from the selected group with an equal probability and outputs, as the update index value, an index value corresponding to the selected flag value. The selecting unit 35 may be implemented by, for example, a logic circuit, an application-specific electronic circuit such as an ASIC or FPGA, a processor such as a CPU or DSP, a microcontroller, or the like.

The count value correcting unit 36 corrects the count value $N_{f1}$ based on the count value $N_{f2}$ and the offset values $E_{off1}$ and $E_{off2}$, and outputs the result as the count value $N_f$ For example, the count value correcting unit 36 computes $N_f = N_{f1} + N_{f2} \exp[\beta(E_{off1} - E_{off2})]$ and outputs the result. The count value correcting unit 36 may be implemented by, for example, an application-specific electronic circuit such as an ASIC or FPGA or a processor such as a CPU or DSP.

The number-of-trials computing unit 37 computes an expected value $<N_{trial}>$ using, for example, equation (8) described before, based on the offset values $E_{off1}$ and $E_{off2}$ and the count value $N_f$. Note that $(E_{off1} - E_{off2})$ is used as $E_{off}$ of equation (8). The number-of-trials computing unit 37 may be implemented by, for example, an application-specific electronic circuit such as an ASIC or FPGA or a processor such as a CPU or DSP.

The other configurations and operations are substantially the same as those of the sampling apparatus 10 according to the first embodiment.

The sampling apparatus 30 according to the second embodiment described above allows, for example, even in an extreme case where only one of the flag values $F_1$ to $F_N$ is equal to 1 (only one state transition is permitted), another state transition with a certain ratio. Consequently, the ratio in transition probability among the individual state transitions (state variables) in the case of using the sampling apparatus 30 is successfully approximated to the ratio in transition probability among the individual state transitions obtained using the ordinary MCMC method. The expected value $<N_{trial}>$ computed using the count value $N_f$ that has been corrected in the above-described manner approaches to the number of trials in which one state remains unchanged obtained using the ordinary MCMC method. Therefore, the probability process closer to that of the ordinary MCMC method may be obtained.

The operation of the sampling apparatus 30 according to the second embodiment described above may also be performed using the single offset control units 13, the single comparing unit 14, and the single flag counting unit 15. In such a case, the count values $N_{f1}$ and $N_{f2}$ for the two kinds of flag values (the flag values $F_1$ to $F_N$ and the flag values $F_{na1}$ to $F_{naM}$) are obtained through an operation below.

Figure 13:
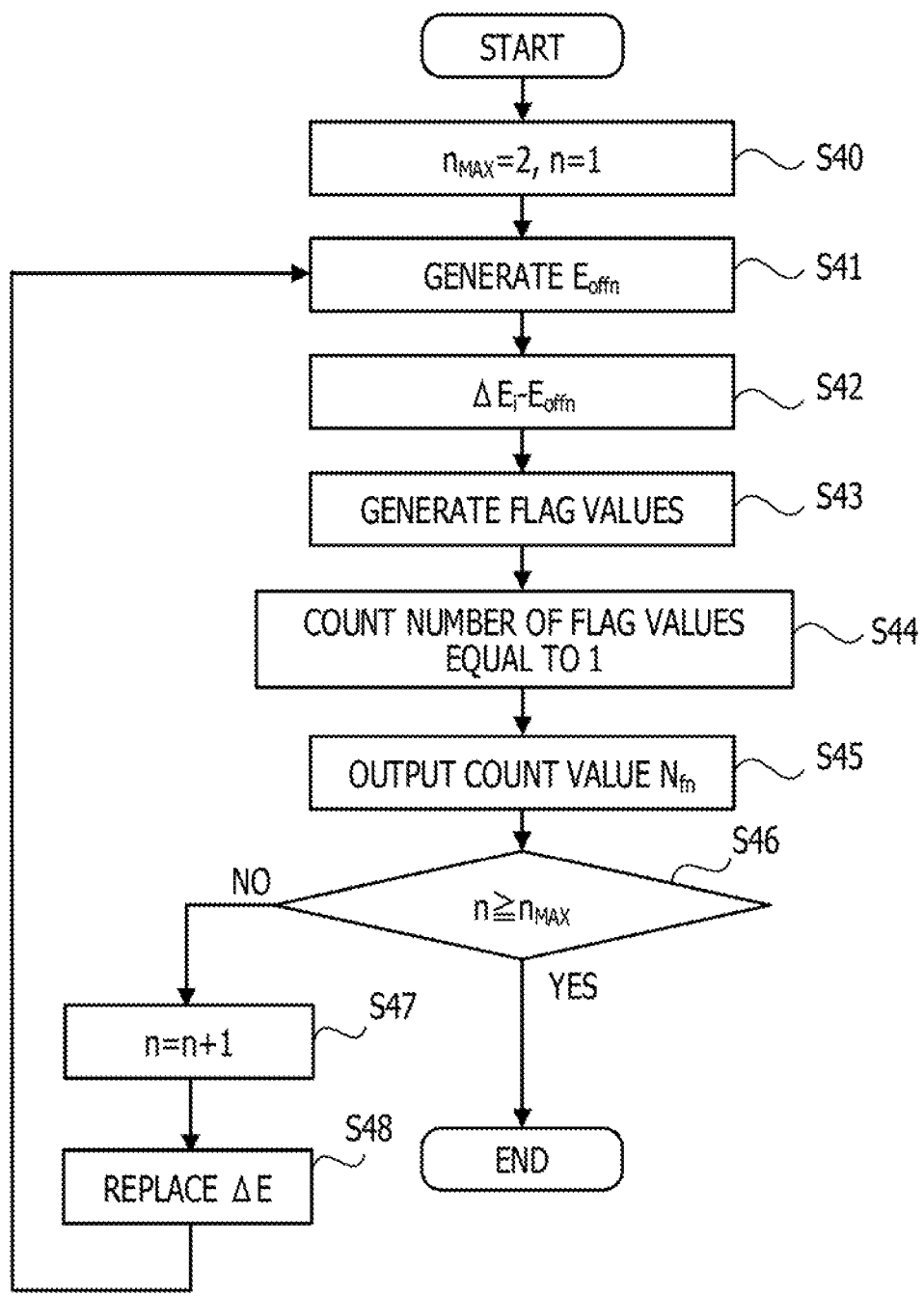
FIG. 13 is a flowchart illustrating an example of a flow of an operation for generating count values for two types of flag values.

FIG. 13 is a flowchart illustrating an example of a flow of an operation for generating the count values $N_{f1}$ and $N_{f2}$ for the two kinds of flag values.

The process described below is controlled by, for example the control unit 17 illustrated in FIG. 1 (not illustrated in FIG. 12).

First, the control unit 17 sets $n_{MAX}$ to 2 and sets n to 1 (step S40). The control unit 17 then causes the offset control unit 13 to generate an offset value $E_{offn}$ (the offset value $E_{off1}$ in the case of n=1) (step S41). The offset control unit 13 computes the evaluation values obtained by subtracting the offset value $E_{offn}$ from the energy changes $\Delta E_i$ (i=1 to N) (step S42). In the case where the offset control unit 13 illustrated in FIG. 4 is used, the offset value $E_{offn}$ is equal to 0 if the minimum value $\Delta E_{min}$ of the energy changes $\Delta E_i$ is smaller than 0, whereas the offset value $E_{offn}$ is equal to the minimum value $\Delta E_{min}$ if the minimum value $\Delta E_{min}$ is greater than or equal to 0.

Based on the results of comparing the plurality of evaluation values with the threshold determined based on the temperature value T and a random number value, the comparing unit 14 generates flag values (the flag values $F_1$ to $F_N$ in the case of n=1) (step S43).

The flag counting unit 15 counts the number of flag values that are equal to 1 (step S44), and outputs the count value $N_{fn}$ (the count value $N_{f1}$ in the case of n=1) (step S45).

The control unit 17 determines whether or not $n \geq n_{MAX}$ is satisfied (step S46). If $n \geq n_{MAX}$ is satisfied, the control unit 17 ends the process for generating the count values $N_{f1}$ and $N_{f2}$. If $n < n_{MAX}$ is satisfied, the control unit 17 substitutes n+1 for n (step S47). The control unit 17 replaces the energy changes $\Delta E_i$ with the energy changes $\Delta E_{na1}$ to $\Delta E_{naM}$ using the function of the replacing unit 31 described above (step S48), and repeats the processing from step S41.

The processing other than that of steps S44 and S45 is performed in each trial.

Third Embodiment

Figure 14:
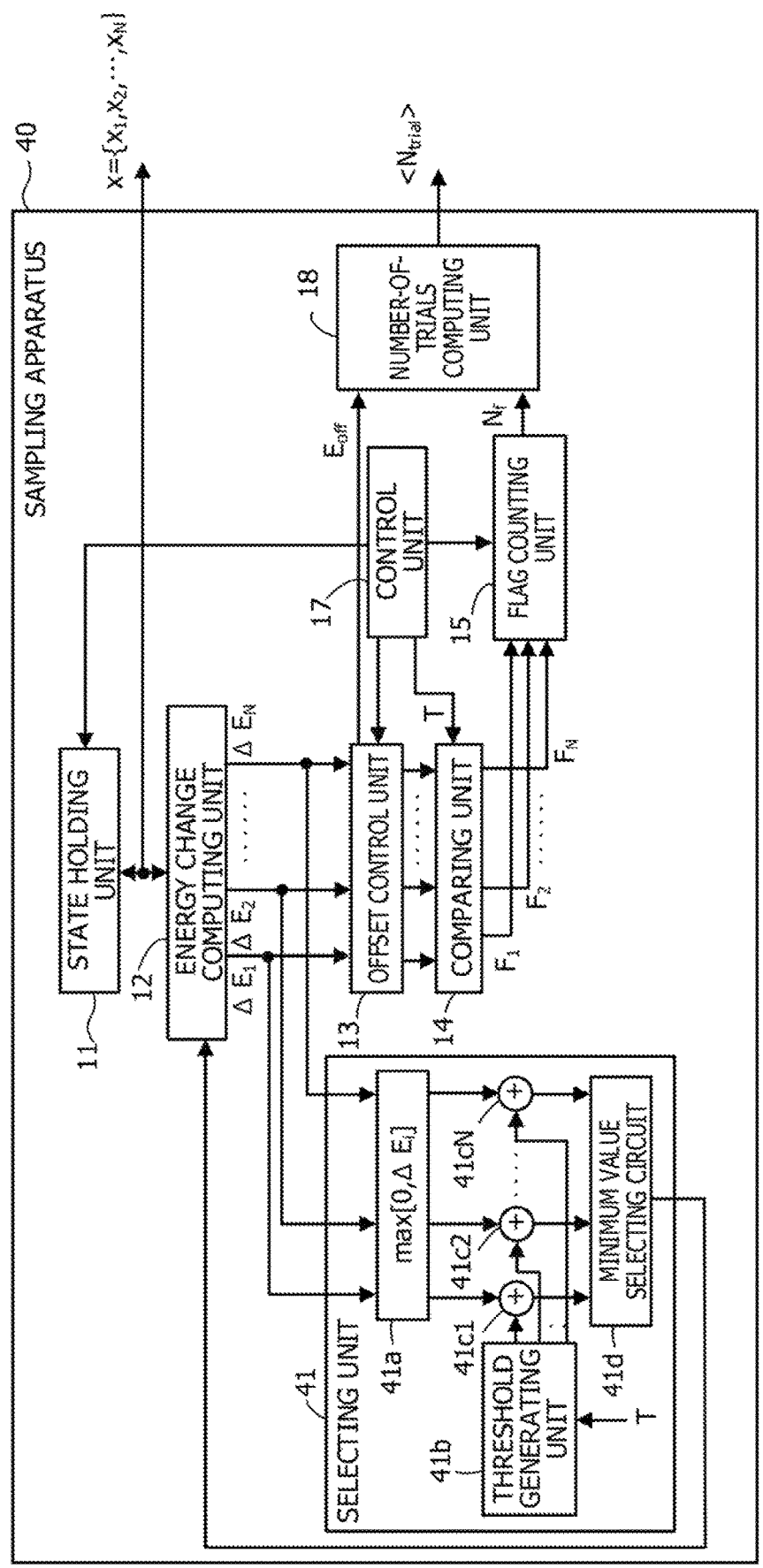
FIG. 14 is a diagram illustrating an example of a sampling apparatus according to a third embodiment.

FIG. 14 is a diagram illustrating an example of a sampling apparatus according to a third embodiment. The description of components in FIG. 14 that are the same as those illustrated in FIG. 1 is omitted.

A sampling apparatus 40 according to the third embodiment includes a selecting unit 41 in place of the selecting unit 16 illustrated in FIG. 1.

The selecting unit 41 generates a plurality of updated energy change values obtained by updating energy changes that are smaller than 0 among the energy changes $\Delta E_1$ to $S\Delta_N$ to 0. The selecting unit 41 outputs, as the update index value, an index value corresponding to the minimum evaluation value among a plurality of evaluation values obtained by adding corresponding threshold values to the respective updated energy change values. The plurality of thresholds are computed based on the temperature value T and a plurality of random number values that are independent of one another.

The selecting unit 41 includes an updated-energy-change-value computing circuit 41a, a threshold generating unit 41b, adding circuits 41c1, 41c2, 41c, and a minimum value selecting circuit 41d.

The updated-energy-change-value computing circuit 41a outputs energy changes of 0 or greater among the energy changes $\Delta E_1$ to $\Delta E_N$ as they are and updates energy changes smaller than 0 to 0 to generate N updated energy change values. The processing of the updated-energy-change-value computing circuit 41a is equivalent to computing max[0, $\Delta E_i$].

The threshold generating unit 41b generates N thresholds. An example of the threshold generating unit 41b will be described later.

The adding circuits 41c1 to 41cN output N evaluation values obtained by adding the corresponding threshold values to the N updated energy change values output by the updated-energy-change-value computing circuit 41a.

The minimum value selecting circuit 41d outputs, as the update index value, an index value corresponding to the minimum evaluation value among the N evaluation values output by the adding circuits 41c1 to 41cN. The index values are supplied to the minimum value selecting circuit 41d, for example, from the energy change computing unit 12. The minimum value selecting circuit 41d includes, for example, a plurality of selecting circuits arranged in a tree shape including a plurality of stages, and each selecting circuit selects and outputs a smaller one of two evaluation values. The index value corresponding to the evaluation value output from the selecting circuit in the last stage serves as the update index value.

Figure 15:
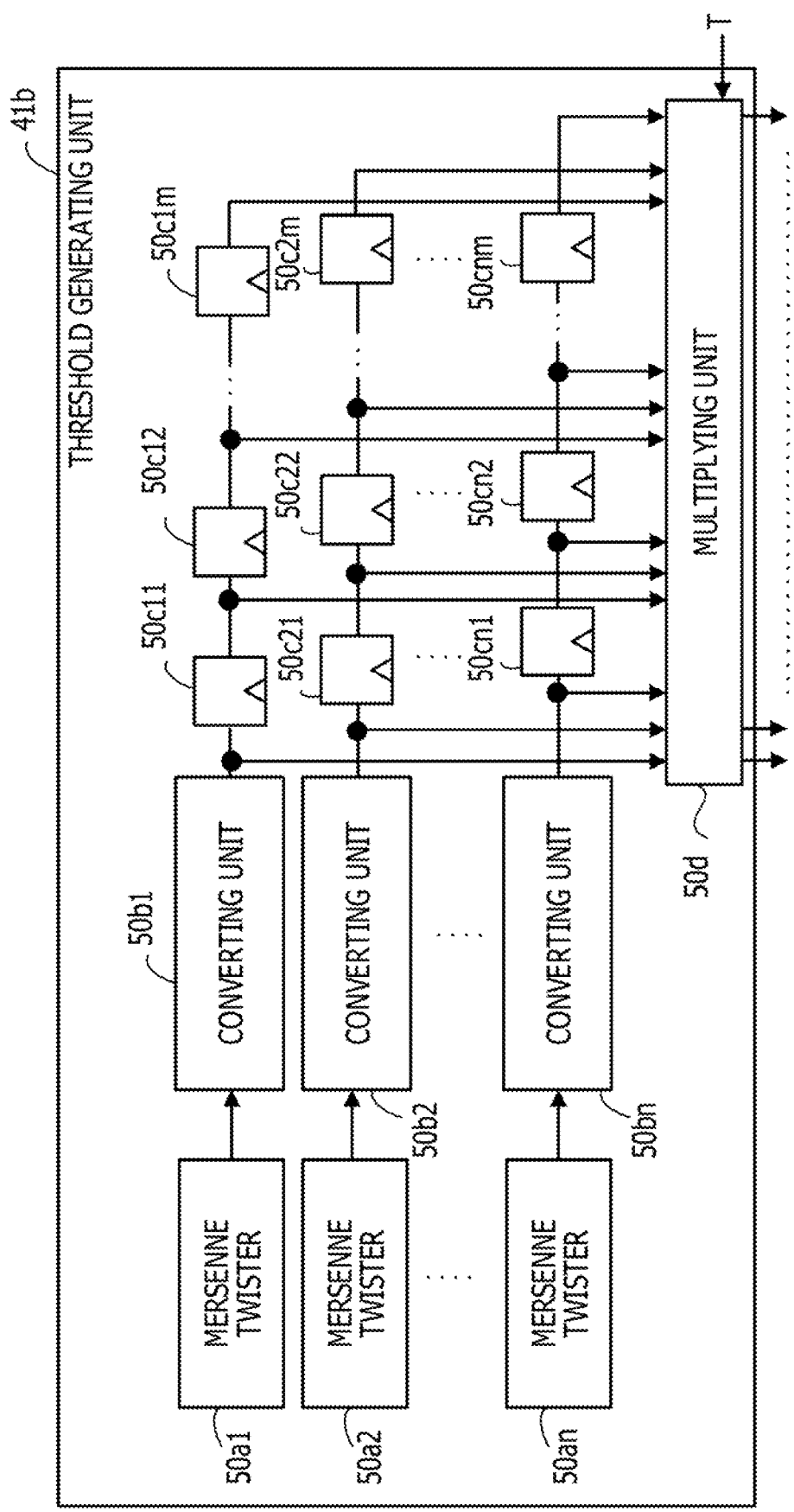
FIG. 15 is a diagram illustrating an example of a threshold generating unit.

FIG. 15 is a diagram illustrating an example of the threshold generating unit.

The threshold generating unit 41b includes Mersenne twisters 50a1, 50a2, ..., 50an, converting units 50b1, 50b2, ..., 50bn, registers 50c11 to 50cnm, and a multiplying unit 50d.

The Mersenne twisters 50a1 to 50an generate corresponding random number values $r_i$, which are uniform random numbers of $0<r_i<1$, by using different seeds for different index values i (i=1 to N). The random number value $r_i$ is represented, for example, by a 16-bit value. Note that the random number value $r_i$ is updated every clock cycle.

The converting units 50b1 to 50bn convert the corresponding random number values $r_i$ into $\log(-\log r_i)$ by using a conversion table. The value $\log(-\log r_i)$ is represented, for example, by a 27-bit value. The conversion table is stored, for example, in a memory such as a RAM or flash memory.

The registers 50c11 to 50cnm delay and output the values output by the respective converting units 50b1 to 50bn in synchronization with a clock signal (not illustrated). For example, m different random number values are generated from the value output by the converting unit 50b1 by the registers 50c11, 50c12, . . . , 50c1m that are coupled in series. In addition, m different random number values are generated from the value output from the converting unit 50b2 by the registers 50c21, 50c22, . . . , 50c2m that are coupled in series. Further, m different random number values are generated from the value output from the converting unit 50bn by the registers 50cn1, 50cn2, . . . , 50cnm that are coupled in series.

The multiplying unit 50d outputs, as the thresholds, values obtained by multiplying, by the temperature value T, the values output by the converting units 50b1 to 50bn and the values output by the registers 50c11 to 50cnm. The multiplying unit 50d includes N multiplying circuits.

For example, in the case of N=1024, the number of Mersenne twisters 50a1 to 50an and the number of converting units 50b1 to 50bn are equal to 32 (n=22), acid the number of registers 50c11 to 50cnm (n×m) are equal to 32×31. With this configuration, 1024 thresholds are generated.

By using the selecting unit 41 in place of the selecting unit 16, a state transition occurs in every trial with an appropriate allowable probability. A reason for this will be described below.

The value of a cumulative distribution function $F(r)=\text{Prob}(r_i \leq r)$ of the random number values $r_i$ which are uniform, random numbers of $0<r_i<1$ is equal to 0 when $r \leq 0$ is satisfied, is equal to r when $0<r<1$ is satisfied, and is equal to 1 when $r \geq 1$ is satisfied. It is assumed that the positive random number value $y_i$ generated from the random number value n is represented by $y_i=-\log(r_i)/A_i$ (where $A_i>0$). The probability $\text{Prob}(y_i \geq y)$ with which the random number value $y_i$ is greater than y (>0) may be represented by $\text{Prob}(y_i \geq y)=\text{Prob}(r_i \leq \exp(-A_i y))=F(\exp(-A_i y))=\exp(-A_i y)$. Therefore, a probability density function $p(y_i)$ of the random number value $r_i$ may be represented by equation (9) below.

$$p(y_i)=-dP/dy|_{y=y_i}=A_i \exp(-A_i y_i) \tag{9}$$

The probability of the random number value $y_i$ for a certain index value of i being smaller than all the other random number values $y_j$ ($j \neq i$) may be represented by equation (10) below.

$$\int_0^\infty p(y_i) \prod_{j \neq i} \exp(-A_j y_i) dy_i = A_i \int_0^\infty \exp\left(-\sum_j A_j\right) y_i dy_i \tag{10}$$

$$= A_i \bigg/ \sum_j A_j$$

The right side of equation (10) is in the same form as in the right side of equation (5).

When $A_i$ is an allowable probability for the energy change $\Delta E_i$ and $A_i$ is equal to $\min[1, \exp(-\beta \Delta E_i)]$, $A_i$ obtained when equation (10) is equal to 1 is the allowable probability to be determined. Note that $\log(A_i)/\beta$ is equal to $-\max[0, \Delta E_i]$.

The random number $y_i$ for a certain index value of i being smaller than all the other random number values $y_j$ ($j \neq i$) is the same as $\log(y_i)/\beta$ being smaller than $\log(y_j)/\beta$ ($j \neq i$). Since $\log(y_i)/\beta$ is equal to $\log(-\log(r_i))/\beta + \max[0, \Delta E_i]$ and $\beta$ is equal to $1/T$, if the smallest one among the values obtained by adding $T \cdot \log(-\log(r_i))$ to $\max[0, \Delta E_i]$ is selected, a state transition occurs in every trial with an appropriate allowable probability.

The other configurations and operations are substantially the same as those of the sampling apparatus 10 according to the first, embodiment.

Figure 16:
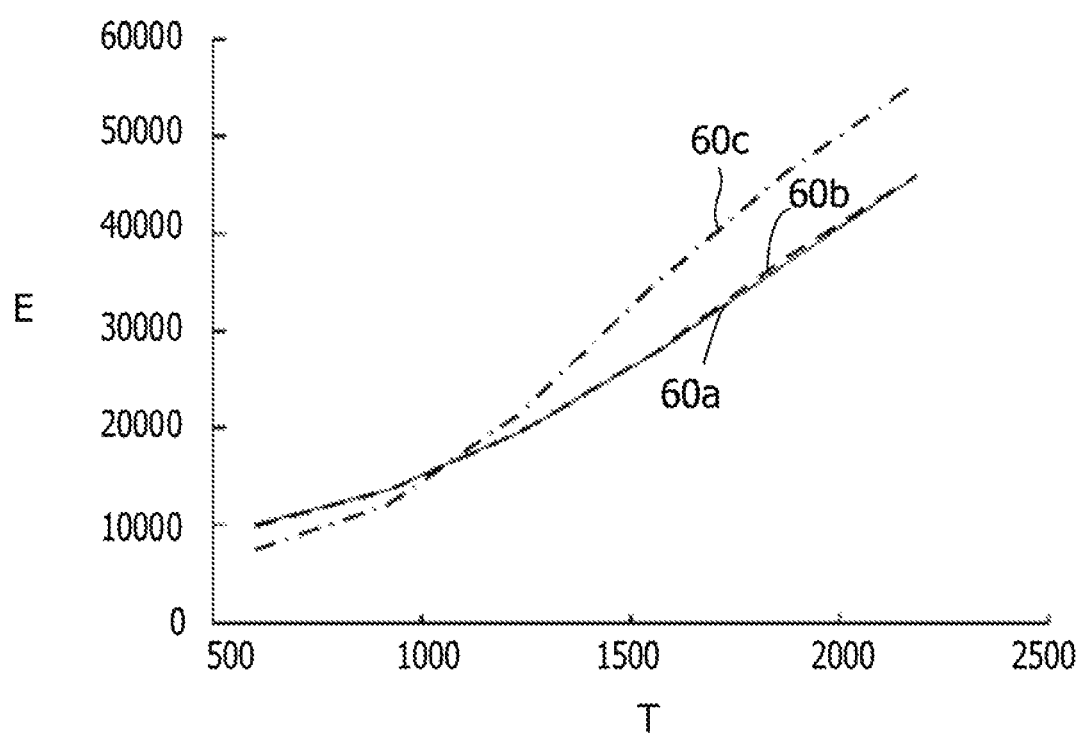
FIG. 16 is a diagram illustrating an example of a simulation result regarding, a relationship between temperature and energy.

FIG. 16 is a diagram illustrating an example of a simulation result regarding a relationship between temperature and energy.

Figure 17:
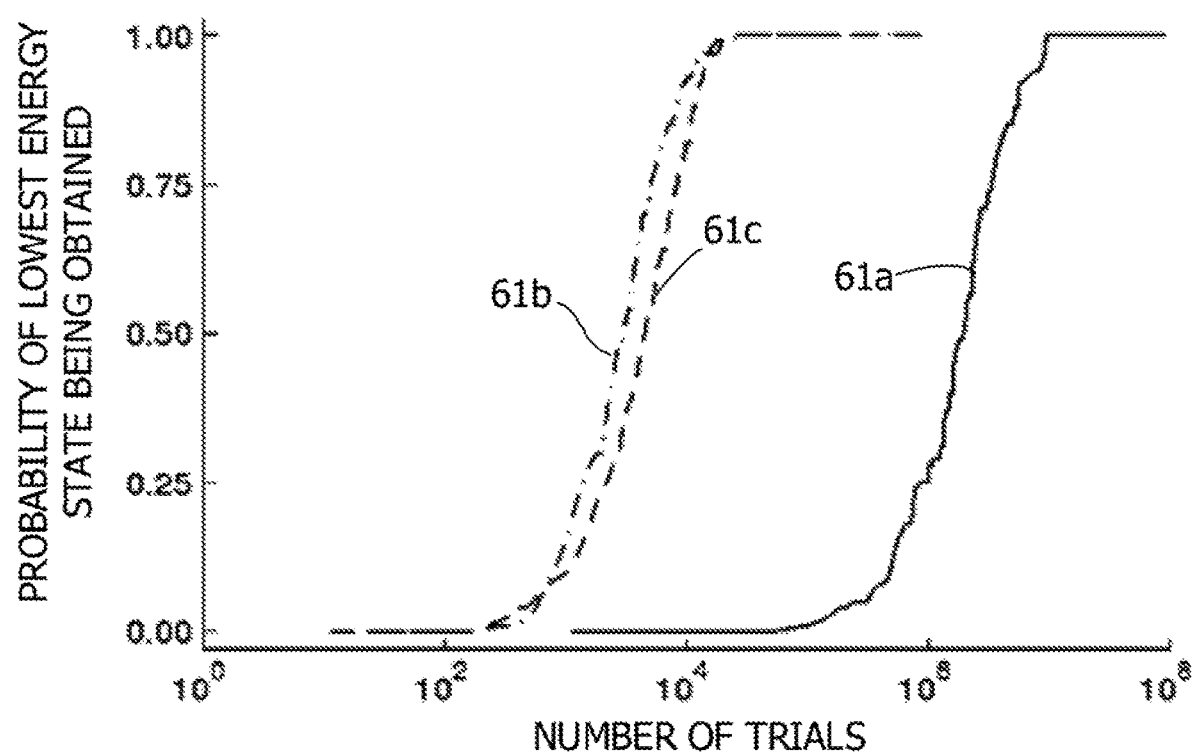
FIG. 17 is a diagram illustrating an example of a simulation result regarding a relationship between the number of trials and a probability of obtaining a lowest energy state.

FIG. 17 is a diagram illustrating an example of a simulation result regarding a relationship between the number of trials and the probability with which the lowest energy state is obtained. The problem dealt with in FIGS. 16 and 17 is a 16-city traveling salesman problem.

In FIG. 16, the horizontal axis represents the temperature value T, and the vertical axis represents the energy E represented by equation (1). Characteristics 60a indicate a relationship between the temperature and the energy in the case where the ordinary MCMC method is used. Characteristics 60b indicate a relationship between the temperature and the energy in the case where the sampling apparatus 40 according to the third embodiment is used. Characteristics 60c indicate a relationship between the temperature and the energy in the case where the optimization apparatus of the related art using digital circuitry is used.

As indicated by FIG. 16, the sampling apparatus 40 according to the third embodiment obtains almost the same characteristics as those obtained in the case where the ordinary MCMC method is used.

In FIG. 17, the horizontal axis represents the number of trials, and the vertical axis represents the probability with which the lowest energy state is obtained. Characteristics 61a indicate a relationship between the number of trials and the probability in the case where the ordinary MCMC method is used. Characteristics 61b indicate a relationship between the number of trials and the probability in the case where the sampling apparatus 40 according to the third embodiment is used. Characteristics 61c indicate a relationship between the number of trials and the probability in the case where the optimization apparatus of the related art using digital circuitry is used.

FIG. 17 indicates that the sampling apparatus 40 according to the third embodiment attains the lowest energy state at a higher speed (with a less number of trials) than in the cases where the optimization apparatus of the related art and the ordinary MCMC method are used.

As described above, in the sampling apparatus 40 of the third embodiment, the state transition occurs ideally in one trial and the sample distribution equivalent to that of the ordinary MCMC method is theoretically obtained. Thus, highly accurate high-speed sampling may be implemented.

Modification

A sampling apparatus described below uses a replica exchange method.

The replica exchange method is a method of simultaneously performing the MCMC method using a plurality of temperatures, comparing the energies of respective states every certain number of trials, and exchanging states (or temperatures) for two temperatures with an appropriate probability. In the following example, a description will be given of the case where the temperatures are exchanged; however, the same result will be obtained if the states are exchanged.

Figure 18:
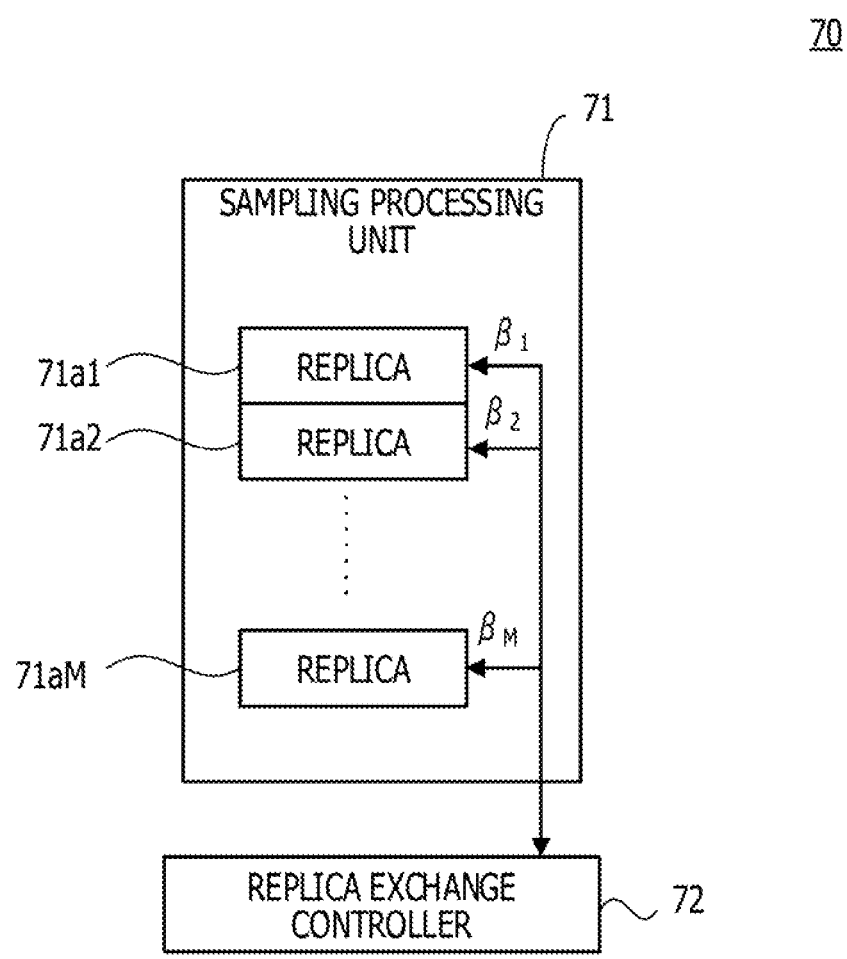
FIG. 18 is a diagram illustrating an example of a sampling apparatus using a replica exchange method.

FIG. 18 is a diagram illustrating an example of the sampling apparatus using the replica exchange method.

A sampling apparatus 70 illustrated in FIG. 18 includes a sampling processing unit 71 and a replica exchange controller 72.

The sampling processing unit 71 includes each unit of the sampling apparatus 10 illustrated in FIG. 1, and performs, through pipeline processing, the above-described trials for replicas 71a1, 71a2, . . . , 71aM in which different temperature values T (in the example of FIG. 18, inverse temperatures $\beta_1, \beta_2, \ldots, \beta_M$) are set.

The state x and the energy E are held for each of the replicas 71a1 to 71aM and are updated every time the trial is performed.

The replica exchange controller 72 compares, every certain number of trials, the energies E of the replicas 71a1 to 71aM with one another, and exchanges, based on the comparison results, the reverse temperatures (or temperatures) set in two of the replicas 71a1 to 71aM with a certain exchange probability $p_{ij}$. The exchange probability $p_{ij}$ may be represented by $p_{ij}=f((\beta_i-\beta_j)(E_i-E_j))$. In the equation, $\beta_i$ denotes the reverse temperature set in the i-th replica, $\beta_j$ denotes the inverse temperature set in the j-th replica, $E_i$ denotes the energy in the i-th replica, and $E_j$ denotes the energy in the j-th replica. In the function f, $\beta_i-\beta_j$ used in place of $\beta$ in equation (3), and $E_i-E_j$ is used in place of $\Delta E$ in equation (3).

The replica exchange controller 72 may be, for example, an application-specific electronic circuit such as an ASIC or FPGA, a processor such as a CPU or DSP, or the like.

The processing performed by the replica exchange controller 72 may be performed by the control unit 17 illustrated in FIG. 1.

The sampling operation is performed every certain number of trials. For example, the state x, the count, value $N_f$ and the offset value $E_{off}$ for a replica having the smallest temperature value T are output.

Figure 19:
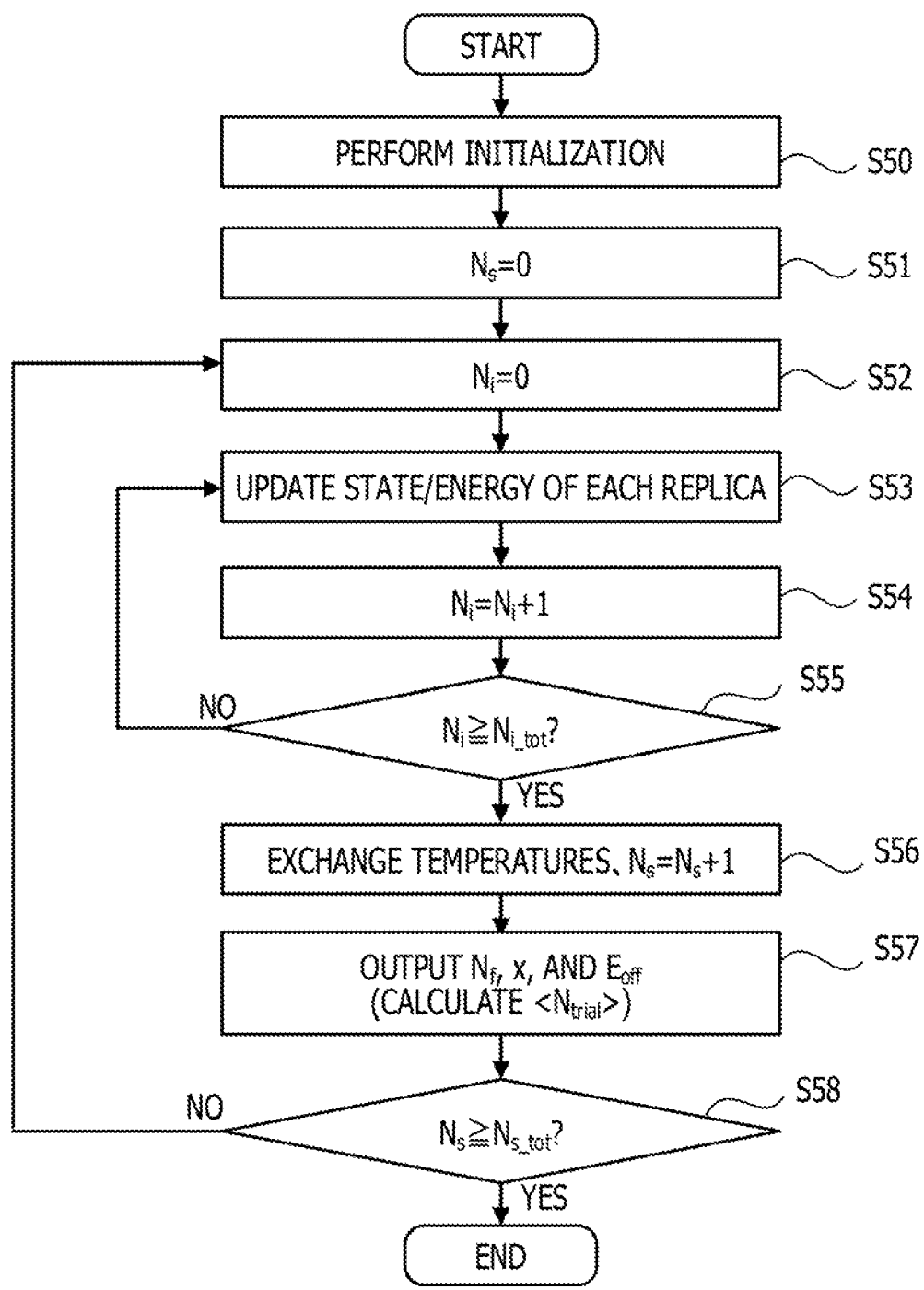
FIG. 19 is a flowchart illustrating an example of an operation of the sampling apparatus using the replica exchange method.

FIG. 19 is a flowchart illustrating an example of the operation performed by the sampling apparatus using the replica exchange method. Note that the illustration and description of the same processing as that of the operation of the sampling apparatus 10 according to the first embodiment illustrated in FIG. 10 are omitted.

When the replica exchange method is used, a maximum reverse temperature $\beta_{max}$, a minimum reverse temperature $\beta_{min}$, the number of trials $N_{i\_tot}$ indicating an exchange interval and the total number of times of sampling $N_{\_tot}$ are set in the replica exchange controller 72 in initialization (step S50). The replica exchange controller 72 may read these parameters from a storage unit (not illustrated), for example. In the initialization, the replica exchange controller 72 sets initial values of the inverse temperatures $\beta_1$ to $\beta_M$ in the replicas 71a1 to 71aM, respectively, based on the maximum reverse temperature $\beta_{max}$ and the minimum reverse temperature $\beta_{min}$.

For example, the replica exchange controller 72 sets 0 as the number of times of sampling $N_s$ in a counter (not illustrated) (step S51). The replica exchange controller 72 sets 0 as the number of trials $N_i$ in another counter (not illustrated) (step S52). The trials are then performed, and the state x and the energy E of each of the replicas are updated (step S53). The replica exchange controller 72 increases the number of trials N, by 1 (step S54), and determines whether or not $N_i \geq N_{i\_tot}$ is satisfied (step S55). If $N_i \geq N_{i\_tot}$ is not satisfied, the processing is repeated from step S53.

If $N_i \geq N_{i\_tot}$ is satisfied, the replica exchange controller 72 exchanges temperatures (inverse temperatures $\beta$) of the replicas with the exchange probability described above and increases the number of times of sampling $N_s$ by 1 (step S56). The replica exchange controller 72 causes the count value $N_f$, the state x, and the offset value $E_{off}$ of the replica having the minimum temperature value T (the maximum reverse temperature $\beta$) to be output (step S57). Based on the count value $N_f$ and the offset value $E_{off}$ that are output, the number-of-trials computing unit 18 illustrated in FIG. 1 computes the expected value $<N_{trial}>$.

Thereafter, the replica exchange controller 72 determines whether or not $N_s \geq N_{s\_tot}$ is satisfied (step S58). If $N_s \geq N_{s\_tot}$ is not satisfied, the processing is repeated from step S52.

If $N_s \geq N_{s\_tot}$ is satisfied, the replica exchange controlller 72 ends the sampling operation.

Such a sampling apparatus 70 using the replica exchange method is advantageous in that the escape from the local solution is fast and optimization of the temperature value T is easy.

Another modification of the sampling apparatus will be described next.

Figure 20:
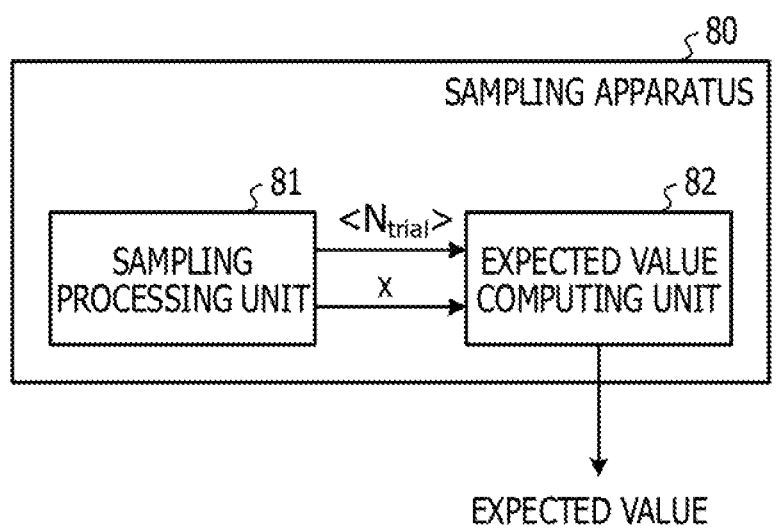
FIG. 20 is a diagram illustrating another modification of the ambling apparatus.

FIG. 20 is a diagram illustrating another cation of the sampling apparatus.

A sampling apparatus 80 illustrated in FIG. 20 includes a sampling processing unit 81 and an expected value computing unit 82.

The sampling processing unit 81 includes each unit of the sampling apparatus 10 illustrated in FIG. 1, and outputs the expected value $<N_{trial}>$ and the state x every certain number of trials.

Based on the expected value $<N_{trial}>$ and the state x, the expected value computing unit μcomputes the expected value of an amount $f_n=f(x(i))$ which is desired to be determined based on the sample average, and outputs the expected value. The function f(x(i)) is, for example, $x_i$, $x_i \times x_j$, or the like. The expected value may be represented by expression (11) below.

$$\sum_{n=1}^{M} f_n \tau_n \bigg/ \sum_{n=1}^{M} \tau_n \quad (11)$$

In expression (11), n denotes the number of times of sampling and M denotes the total number of times of sampling. In addition $\tau_n$ denotes the expected value $<N_{trial}>$ in the n-th sampling.

The processing performed by the expected value co outing unit 82 may be performed by the control unit 17 illustrated in FIG. 1.

Figure 21:
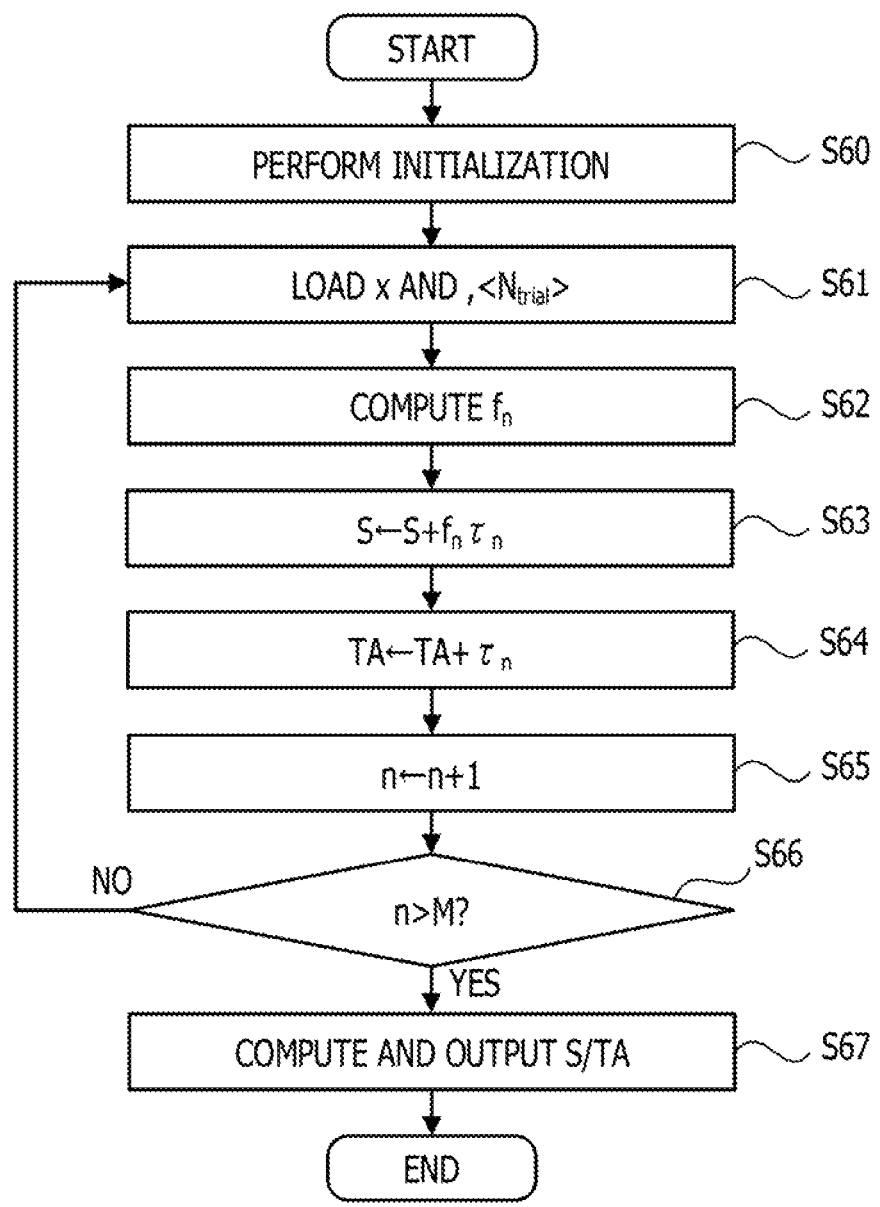
FIG. 21 is a flowchart illustrating an example of an operation of the sampling apparatus that performs an expected value computation process.

FIG. 21 is a flowchart illustrating an example of the operation performed by the sampling apparatus that performs an expected value computation process. Note that the illustration and description of the same processing as that of the operation of the sampling apparatus 10 according to the first embodiment illustrated in FIG. 10 are omitted.

When the expected value computation process is performed, the expected value computing unit 82 sets a variable S denoting the sum of $f_n \tau_n$ and a variable TA denoting the sum of $\tau_n$ in expression (11) to 0 in initialization (step S60). The total number of times of sampling M is set in the expected value computing unit 82. The value of a counter (not illustrated) that counts the number of times of sampling n is reset to 0.

At the sampling timing, the expected value computing unit 82 loads the state x and the expected value $<N_{trial}>$ output by the sampling processing unit 81 (step S61), and computes $f_n=f(x(i))$ (step S62). The expected value computing unit 82 updates the variable S by adding $f_n \tau_n$ to the current variable S (step S63), and updates the variable TA by adding $\tau_n$ to the current variable TA (step S64). Then, the expected value computing unit 82 causes the counter (not illustrated) to increase the number of times of sampling n by 1 (step S65) and determines whether or not n>M is satisfied (step S66). If n>M is not satisfied, the expected value computing unit 82 repeats the processing from step S61.

If n>M is satisfied, the expected value computing unit 82 computes S/TA, outputs the result as the expected value represented by expression (11) (step S67), and ends the expected value computation process.

The expected value computing unit 82 that performs the expected value computation processing described above may be implemented using, for example, a multiply-add circuit, a storage unit (such as a register), and so on. Alternatively, the expected value computing unit 82 may be implemented by, for example, an application-specific electronic circuit such as an ASIC or FPGA, a processor such as a CPU or DSP, or the like.

Since the expected value computation process involves a relatively large amount of computation, when the expected value computation process is performed outside the sampling apparatus 80, a possible bottleneck is input/output of the state variable x and so on between the sampling apparatus 80 and an external apparatus. However, such a bottleneck is advantageously overcome by performing the expected value computation process in the sampling apparatus 80 as described above.

Each of the modifications described above may be combined with each of the sampling apparatuses 10, 30, 40 according to the first to third embodiments.

Although an aspect of the sampling apparatuses and the methods for controlling the sampling apparatuses according of the present disclosure have been described above based on the embodiments, the sampling apparatuses and the methods for controlling the sampling apparatuses are merely examples and the present disclosure is not limited the description above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory configured to hold values of a plurality of state variables included in an evaluation function representing energy, and outputs, every certain number of trials, the values of the plurality of state variables;
an energy change computing circuit including a selector, a multiplier and an adder configured to compute, when one of first state transitions occurs in response to changing of one of the values of the plurality of state variables, an energy change value for each first state transition based on a weight value selected based on an update index value;
a first offset control circuit configured to determine a first offset value when a minimum value of a plurality of the energy change values is greater than or equal to 0 such that at least one of the first state transitions is allowed and output, in parallel, a plurality of first evaluation values obtained by adding the first offset value to the plurality of the energy change values and the first offset value every certain number of trials;
a first comparing circuit configured to compare each of the plurality of first evaluation values with a threshold that is determined based on a random number value and a temperature value indicating a temperature to obtain a plurality of first flag values as results of a comparison, output a first value, as one of the plurality of first flag value, indicating that the corresponding first state transition is allowed when the respective first evaluation values are greater than the threshold from among the plurality of first flag values and output a second value, as one of the plurality of first flag value, indicating that the corresponding first state transition is not allowed when the respective first evaluation values are smaller than or equal to the threshold from among the plurality of first flag values;
a first flag counting circuit including a plurality of first adding circuits, which are arranged in a tree shape and includes a plurality of stages, configured to receive, in parallel, the plurality of first flag values and output, every certain number of trials, a first count value obtained by counting a number of the plurality of first flag values by adding adjacent values of the plurality of first flag values by using first adding circuits at a first stage of the plurality of stages or adding one or more adjacent values output from one or more first adding circuits at a first or subsequent stage of the plurality of stages using one or more first adding circuits at a next stage of the first or subsequent stage;
a selecting circuit configured to select one of the plurality of first flag values, based on a magnitude relationship between results obtained by adding corresponding random number values that are independent of one another to the respective first values and output, as the update index value, an index value corresponding to the selected first flag value;
a number-of-trials computing circuit configured to compute an expected value of the number of trials in which one state remains unchanged in a state transition according to a Markov chain Monte Carlo method, based on the first offset value and the first count value;
a replacing circuit configured to output, in parallel, a plurality of non-allowable energy change values for a plurality of second state transitions from among the plurality of energy change values;
a second offset control circuit configured to determine a second offset value different from the first offset value, based on the plurality of non-allowable energy change values, such that at least one of the plurality of second state transitions is allowed, output, every certain number of trials, the second offset value and output, in parallel, a plurality of second evaluation values different from the plurality of first evaluation values and obtained by adding the second offset value to the plurality of non-allowable energy change values;

a second comparing circuit configured to compare each of the plurality of second evaluation values with the threshold to obtain a plurality of second flag values as results of a comparison, output, as one of the plurality of second flag value, the first value indicating that the corresponding second state transition is allowed when the respective second evaluation values are greater than the threshold from among the plurality of second flag values and output, as one of the plurality of second flag value, the second value indicating that the corresponding second state transition is not allowed when the respective second evaluation values are smaller than or equal to the threshold from among the plurality of second flag values;

a second flag counting circuit including a plurality of second adding circuits, which are arranged in a tree shape and includes a plurality of stages, configured to receive, in parallel, the plurality of second flag values and output, every certain number of trials, a second count value obtained by counting a number of the plurality of second flag values by adding adjacent values of the plurality of second flag values by using second adding circuits at a first stage of the plurality of stages or adding one or more adjacent values output from one or more second adding circuits at a first or subsequent stage of the plurality of stages using one or more second adding circuits at a next stage of the first or subsequent stage; and a count value correcting circuit configured to correct the first count value based on the second count value, the first offset value, and the second offset value.

2. The information processing apparatus according to claim 1, wherein an expected value of the number of trials is computed according to the Markov chain Monte Carlo method, based on the corrected count value, the first offset value, and the second offset value.

3. The information processing apparatus according to claim 1, wherein the selecting circuit is configured to:

generate a plurality of updated energy change values obtained by updating a change value smaller than 0 to 0 among the plurality of the energy change values; and output, as the update index value, an index value corresponding to a smallest third evaluation value among a plurality of third evaluation values obtained by adding corresponding second thresholds calculated based on the temperature value and a plurality of random number values that are independent of one another, to the respective updated energy change values.

* * * * *